(12) United States Patent
Halladay

(10) Patent No.: US 6,844,412 B2
(45) Date of Patent: Jan. 18, 2005

(54) AMBIENT CURED COATINGS AND COATED RUBBER PRODUCTS THEREFROM

(75) Inventor: James R. Halladay, Harborcreek, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/205,178

(22) Filed: Jul. 25, 2002

(65) Prior Publication Data
US 2004/0018312 A1 Jan. 29, 2004

(51) Int. Cl.[7] ............................................. C08C 19/30
(52) U.S. Cl. .............................. 528/25; 26/27; 26/28; 26/29
(58) Field of Search .......................... 528/25, 26, 27, 528/28, 29

(56) References Cited

U.S. PATENT DOCUMENTS

| | | | |
|---|---|---|---|
| RE27,145 E | | 6/1971 | Jones |
| 3,674,743 A | * | 7/1972 | Verdol et al. ............... 528/68 |
| 4,039,593 A | | 8/1977 | Kamienski et al. |
| 4,118,427 A | | 10/1978 | Rhein et al. |
| 4,207,409 A | | 6/1980 | Ladenberger et al. |
| 4,337,329 A | | 6/1982 | Kubo et al. |
| 4,384,081 A | | 5/1983 | Kubo et al. |
| 4,452,950 A | | 6/1984 | Wideman |
| 4,581,417 A | | 4/1986 | Buding et al. |
| 4,581,491 A | | 4/1986 | Boothroyd |
| 4,631,315 A | | 12/1986 | Buding et al. |
| 4,795,788 A | | 1/1989 | Himmler et al. |
| 4,900,772 A | | 2/1990 | Imanaka et al. |
| 4,910,321 A | | 3/1990 | Kennedy et al. |
| 4,960,942 A | | 10/1990 | Gerkin et al. |
| 4,973,761 A | | 11/1990 | Schoenleben et al. |
| 4,975,488 A | * | 12/1990 | Furukawa et al. .......... 525/100 |
| 4,987,200 A | | 1/1991 | Datta et al. |
| 4,997,882 A | | 3/1991 | Martz et al. |
| 5,003,107 A | | 3/1991 | Zimmerman et al. |
| 5,039,755 A | | 8/1991 | Chamberlain et al. |
| 5,045,114 A | | 9/1991 | Bigalk et al. |
| 5,051,463 A | | 9/1991 | Yukimoto et al. |
| 5,169,914 A | | 12/1992 | Kuszas et al. |
| 5,223,575 A | * | 6/1993 | Mori et al. ................ 525/102 |
| 5,319,032 A | | 6/1994 | Martz et al. |
| 5,350,819 A | | 9/1994 | Shaffer |
| 5,352,835 A | | 10/1994 | Dai et al. |
| 5,376,745 A | | 12/1994 | Handlin, Jr. et al. |
| 5,397,602 A | | 3/1995 | Martz et al. |
| 5,422,042 A | | 6/1995 | Waddill et al. |
| 5,448,100 A | | 9/1995 | Beasom |
| 5,457,147 A | | 10/1995 | McGrath et al. |
| 6,020,446 A | * | 2/2000 | Okamoto et al. .......... 526/279 |
| 6,025,445 A | | 2/2000 | Chiba et al. |
| 6,252,008 B1 | | 6/2001 | Scholl et al. |
| 6,335,412 B1 | | 1/2002 | Okamoto et al. |
| 6,410,640 B1 | | 6/2002 | Fukunaga et al. |

FOREIGN PATENT DOCUMENTS

| | | | | |
|---|---|---|---|---|
| EP | 111412 | 12/1983 | | |
| EP | 325997 | 1/1989 | | |
| GB | 884448 | 2/1958 | | |
| GB | 1558491 | 8/1976 | | |
| JP | 172423/1994 | 6/1994 | | |
| JP | 7-108929 | 4/1995 | | |
| JP | 2001207009 A | * | 7/2001 | ........... C08L/33/04 |
| WO | WO 03/042309 | 5/2003 | | |

* cited by examiner

Primary Examiner—Margaret G. Moore
Assistant Examiner—Marc S. Zimmer
(74) Attorney, Agent, or Firm—Miles B. Dearth

(57) ABSTRACT

The present invention provides an ambient temperature curable coating and coated articles therefrom in a rubbery, high elongation, weatherable coating composition which can be applied to flexible elastomeric substrates for a variety of purposes. Depending on the film forming polymer used in the composition, it may be used to provide resistance to ozone, oils and solvents, or the coating may be applied for the purposes of enhancing the cosmetic appearance of the substrate rubber. The curable coating mixture is a mixture of two parts, one part containing a solution of a functional film forming polymer, and the other part providing the curing component. The stability as a premixed, one-part solution is limited to up to several months. The curable film former and curing component are mixed together at an overall 4% to 25% solids content. The viscosity is less than 20,000 cps (Brookfield) such that the coating can be sprayed, brushed or dipped to form thin coatings of from 0.001–0.020 mils.

26 Claims, No Drawings

US 6,844,412 B2

AMBIENT CURED COATINGS AND COATED RUBBER PRODUCTS THEREFROM

FIELD OF INVENTION

The present invention is directed to low viscosity organic solutions as ambient temperature curable coatings which are brushed, dipped or spray-applied to substrates such as rubbery elastomers, rigid metals or flexible-rigid thermoplastic substrates to provide enhanced appearance, resistance to solvents and fuels, and enhanced ozone resistance to the substrate. Such a coating is flexible and can be factory-applied on original equipment or provided as a D-I-Y coating or repair finish recoating in the field.

BACKGROUND OF THE INVENTION

Fast reacting sealants which are moisture curable and contain plasticized rubbery polymers and reactive silanes, along with catalysts are known. See for example U.S. Pat. Nos. 6,335,412, 5,051,463, 6,025,445, and 6,410,640. Such rheology, and plasticizer renders these compositions unsuitable as brushable, dippable and sprayable coatings, and plasticizer. As thin film coatings of 1–5 mils, plasticizer would be expected to interfere with adhesion and scuffing. Furthermore catalysts used in such sealants provide problems regarding pot life.

Coatings in which the application is made by way of brushing, dipping and spraying require low viscosity solutions with sufficient pot life so that gelation does not occur once the coating composition is open to the atmosphere. Coatings that provide a curing speed whereby they are dry-to-the-touch in a few hours, but provide sufficient pot life would be useful

SUMMARY OF THE INVENTION

The present invention provides an ambient temperature curable coating and coated articles therefrom in a rubbery, high elongation, weatherable coating composition which can be applied to flexible elastomeric substrates for a variety of purposes. Preferred film forming polymers used in the composition provide resistance to ozone, oils and solvents, and other embodiments may be applied for the purposes of enhancing the cosmetic appearance of the substrate rubber. The coating composition of the invention is resistant to long-term flex-fatigue and provides for excellent adhesion to flexible elastomeric substrates and exhibits in the cured state at least 100% elongation as an unsupported film.

The curable coating mixture is a mixture of two parts, one part containing a solution of a functionalized film forming polymer, and the other part providing the curing component coreactive with the functionalized polymer. The stability as a premixed, one-part solution is limited to up to several months. The curable film former and curing component are mixed together at an overall 4% to 25% solids content. The viscosity can vary depending on the selected components and must be less than 20,000 cps (Brookfield) such that the coating can be sprayed, brushed or dipped to form thin coatings of from 0.001–0.020 inch.

More specifically, the coating composition of the invention comprises a dilute, sprayable coating containing from 4 to 25% solids content in an organic solution, in the substantial absence (<1000 ppm) of water and less than 1000 ppm of free isocyanate groups, and devoid of condensation catalyst where part (A) contains 100 parts of a functionalized hydrophobic, film forming polymer having a $T_g$ of less than 0° C., (b) 25 to 150 parts a coreactive silane curing component per 100 wt. parts of film former, and the remainder of at least one organic solvent for said film former. The silane chemically bonds to functional sites on the film forming polymer and cures to form siloxane bonds upon condensing of hydrolyzable groups upon exposure of the coated article to air.

In another specific embodiment, metal-filled emissive elastomeric coatings, which are devoid of rubber accelerator, and curable without heat to exhibit durable, weatherable adhesion and long term heat dissipation when applied to flexible polymeric substrates, especially vulcanized rubber articles.

The preferred coatings disclosed herein cure at ambient conditions and are resistant to solvents and fuels, and have enhanced ozone resistance. The cured film forming polymer utilized has at least about 90% light transmissivity or transparency, contains no more than about 90% unsaturation in the cured state, and provides a matrix through which radiant heat reflective (emissive) and thermal transfer properties from the thermally conductive metal particulate filler can deflect and dissipate a significant amount of heat, while the coating adheres permanently and does not undergo stress or environmental cracking or embrittlement. Such coatings are useful to coat molded rubber goods, such as pneumatic or non-neumatic wheels and tires, hoses, belts, mounts, and the like, especially where used near hot bodies, like engine blocks or other industrial components emitting radiant heat.

DETAILED DESCRIPTION OF THE PREFERRED EMBODIMENTS

Functionalized Film Former and Methods for Functionalizing

By hydrophobic is meant that at least 80% of the film forming polymer is derived from water insoluble monomers. Film formers exclude the polyoxyalkylene copolymers.

Functionalized elastomer film-formers used herein cure with the curing component by one or more reaction routes. Blends of two different functionalized film formers are suitable, each having the same or different type of functional groups on the polymer. For example, a blend of carboxylated hydrogenated nitrile butadiene and ethylene acrylic polymer will work. Salt forming reactions and condensation reactions can occur between the film forming polymer and curing component. The interaction between curing component and functional groups on the film forming polymer include electrophile-nucleophile interactions. Functional groups on the film former provide curing routes between the curing component and film forming polymer in addition to the curing of the polymer and curing component to itself and to the coated substrates. Functional groups on the film forming polymer can be provided, such as by copolymerization of a comonomer bearing a reactive group and in various methods to modify film forming polymers by incorporation of functional groups onto the polymer after polymerization.

The term "functionalized" means (1) that an electrophile, nucleophile, especially an active hydrogen-bearing moiety is part of an ethylenic unsaturated comonomer that is copolymerized, or (2) an electrophile, nucleophile and especially an active hydrogen bearing compound is part of a graftlinking compound or ethylenic unsaturated comonomer, which is graft-linked to a film former base polymer, after- or post-polymerization, (3) a group which is reactive to an active hydrogen group as part of a comonomer or graftlinking compound and graft-linked to the film forming base polymer, post-polymerization. The comonomer or grafted compound becomes ionically and/or covalently bonded to the film forming polymer structure, and provides a pendant group capable of reacting with the curing component which is coreactive therewith at ambient temperatures.

Conventional approaches for incorporation of an active hydrogen-bearing functional group or a co-reactive group therewith into a polymerized non-functional elastomer such as by converting a functional group-bearing compound into a suitable functional group precursor or the direct incorporation of a suitable precursor radical may be accomplished when the elastomer is in solution or in the molten state via the "Ene" reaction, whereby an allylic hydrogen transfer to an enophile followed by coupling between two unsaturated termini occurs, or via free-radical addition across a carbon-carbon double bond. When the polymer is in the molten state, however, means capable of imparting high mechanical shear, such as an extruder, will be used to effect the desired reaction to incorporate the functional group to be converted or to directly incorporate a suitable precursor radical. When the functional group to be converted to a suitable precursor or the precursor radical incorporated directly is incorporated via techniques such as metallation followed by reaction with a suitable electrophile, on the other hand, incorporation will, preferably, be accomplished with the polymer in solution.

Of the several methods available for incorporation of a functional group or functional group precursor, those methods tending to incorporate a single functional group or functional group precursor unit at each site of incorporation with minimal coupling of the elastomer polymer such as the ENE reaction and the method involving metallation followed by reaction with an electrophile are preferred. When a functional group to be converted to a suitable precursor is incorporated into the elastomer, conversion of the functional group to the precursor radical will also, generally, be accomplished with the polymer in solution. In general, any of the solvents known to be useful for preparing such elastomer polymers in solution may be used to effect these reactions or conversions.

A variety of post-polymerization functionalization techniques are known which provide modification of a non-functional addition polymer with nucleophilic, or electrophilic crosslinking cure sites for use in the present invention. Hydroxyl groups are useful functional groups for effecting the crosslinking reactions with curing components used herein. U.S. Pat. No. 4,118,427 discloses hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents such as diisobutyl aluminum hydride, to form the hydroxyl-containing polymer.

A partial listing of nucleophilic and/or active hydrogen functional groups that can be incorporated on the film forming polymer that are coreactive with electrophilic group-substituted curing components or hydrolyzable groups are, hydroxy-, mercapto-, isocyanato-, amino-, phenolic-, and carboxyl-groups. Exemplary electrophilic groups incorporated on the film former and coreactive with nucleophilic group-substituted curing components are alkyl halide-, benzyl halide-, allyl halide-, ester-, ethers-, anhydride-groups, and the like. When the film forming polymer contains a pendant nucleophilic group, the corresponding group provided on a group bonded to or through at least one valency of the silicone atom of the silane curing component can also include an alkoxy-, hydroxy-, mercapto-, isocyanato-, amino-, phenolic-, glycido-, carboxyl-, oxirane-, benzyl halide-, allyl halide-, alkyl halide-, ester-, ethers-, and/or anhydride-group.

(A) Functionalized Comonomers

The curable film forming polymer employed herein can be formed by copolymerization of elastomer-forming monomers together with functionalized comonomers or by reaction of a polymer with a functional group containing monomer or reactive compound. The incorporated reactive group subsequently cures the polymer by reaction of the curing component as described herein. The curing method utilizes reactions of a crosslinking component with an active hydrogen-bearing functional group or active hydrogen reactive group which crosslinks with the corresponding reactive functional group on the copolymer or pendant on the copolymer. It is convenient to introduce a functional group bearing comonomer during polymerization of the film former polymer, as is conventionally practiced. The various approaches of free radical addition copolymerization, anionic addition polymerization, free-radical graftlinking, metathesis grafting, and hydrolytic grafting are known in the art. The functional group containing polymers, or copolymers include polymers characterized by their major constituents, such as α-olefin elastomers, diene elastomers, hydrogenated diene elastomers, fluoroelastomers, crosslinkable α-olefin copolymer elastomers, acrylic rubber, acrylate or methacrylate acrylate copolymers, and ethylene-carboxylates, etc.

Preferred examples of rubbery copolymer elastomers include but are not limited to anionic polymerized olefinic elastomers. Examples of anionic polymerized olefinic rubbers include ethylene-propylene rubber, ethylene-propylene-diene monomer rubber, polyisobutylene, or "butyl rubber", or any other polymer of isoolefin optionally copolymerized with conjugated diene (such as isoprene), optionally containing up to 30 wt. % or an α,β-ethylenic unsaturated nitrile and/or styrenic comonomer (such as styrene and/or alkyl substituted styrene), and the like. Particularly preferred elastomers include isobutylene-isoprene copolymer, isobutylene-paramethylstyrene copolymer and the like.

A suitable pendant active hydrogen functional group is provided by methods for forming amine-functionalized ethylene propylene diene monomer rubber (EPDM) by the process described in U.S. Pat. No. 4,987,200. Likewise higher molecular weight isobutylene copolymers functionalized with hydroxyl groups can be produced using the process described in EPA 325 997. Furthermore any commercially available halogenated isobutylene based polymer containing a low level of halogen typically 0.5 to 2.0 mole % can be combined with an alkylamine or an amino alcohol to produce the amine or the hydroxyl functional group respectively.

Functionalized elastomers having an weight average molecular weight of 1000 up to 200,000 and containing hydroxyl and/or amine functional groups are known. Hydroxy terminated polyisobutylenes are conventionally prepared by introducing hydroxy groups into the terminal positions of cationically polymerized isobutylene by dehydrochlorinating, hydroborating and oxidizing chloro-terminal polyisobutylene. Chloro terminated polyisobutylenes obtained by cationically polymerizing an isobutylene monomer are known. See Faust and Kennedy in, "Living Carbocationic Polymerization: III. Demonstration of the Living Polymerization of Isobutylene," Polym. Bull. 15:317–23 (1986), disclosing living carbocationic polymerization of isobutylene and quenching the living recipe with methanol and other reagents such as amines.

Living polymerization methods, some of which are described in U.S. Pat. Nos. 5,350,819; 5,169,914; and 4,910,321 are preferred techniques to form the film forming polymer. General conditions under which living polymerizations can be achieved, for example using isobutylene include: (1) an initiator such as a tertiary alkyl halide, tertiary alkyl ether, tertiary alkyl ester, or the like; (2) a Lewis acid co-initiator which typically comprises a halide of titanium, boron or aluminum; (3) a proton scavenger and/or electron donor; (4) a solvent whose dielectric constant is selected considering the choice of the Lewis acid and the monomer in accord with known cationic polymerization systems and monomer.

Terminal Functional Film Forming Polymers.

Electrophilc groups, nucleophilic groups, groups characterized by bearing an active hydrogen group or groups reactive with active hydrogen groups can be incorporated at the terminus of film former polymers which are useful herein. Terminal groups coreactive with active hydrogen groups on a curing component are useful. These film forming polymers are prepared by known methods.

U.S. Pat. No. 5,448,100 discloses sulfonated telechelic polyisobtuylene prepared by the "inifer" (initiator-transfer agents) initiated carbocationic polymerization of isobutylene with Lewis acid to form polymer, followed by end-quenching with acetyl sulfate and precipitation by steam stripping or with methanol, ethanol, isopropyl alcohol, or acetone. The polymerization preferably occurs in a chlorinated solvent, most preferably in a mixture of solvents, such as methylene chloride, methyl chloride, or an aliphatic or alicyclic compound containing five to ten carbon atoms. The Lewis acid can be, for example, boron trichloride or titanium tetrachloride, or other metal halide (including tin tetrachloride, aluminum chloride, or an alkyl aluminum). End-quenching preferably occurs at a temperature between −90° to 0° C., and most preferably at the polymerization temperature or at the decomposition temperature of the complex. The molar ratio of polyisobutylene to acetyl sulfate is preferably 1:1 or greater.

Another example providing a film former polymer, such as polyisobutylene with terminal active hydrogen groups reactive with a curing component is a terminal silane group bearing a hydroxy or alkoxy group or other hydrolyzable group. These can be obtained by a known route of dehydrohalogenating a terminal tertiary carbon-chlorine group followed by an addition reaction with an ethylenic unsaturated silane. The reaction of a polymer having a terminal tertiary carbon-chlorine bond with allyltrimethylsilane provides a polyisobutylene having an unsaturated group terminally and subsequently reacted with a hydrosilane compound by using a platinum catalyst.

As the hydrosilane compound, there can be mentioned halogenated silanes such as trichlorosilane, methyldichlorosilane, dimethylchlorosilane, phenyldichlorosilane; alkoxysilanes such as trimethoxysilane, triethoxysilane, methyldiethoxysilane, methyldimethoxysilane, phenyldimethoxysilane, etc.; acyloxysilanes such as methyldiacetoxysilane, phenyldiacetoxysilane, etc.; and ketoximate silanes such as bis(dimethylketoximate)methylsilane, bis (cyclohexylketoximate) methylsilane, etc. Among these, halogenated silanes and alkoxysilanes are preferred.

Such production processes are described, for example, in Japanese Kokoku Publication Hei-4-69659, Japanese Kokoku Publication Hei-7-108928, Japanese Kokai Publication Sho-63-254149, Japanese Kokai Publication Sho-64-22904, and Japanese Patent Publication 2539445.

(i) Diene Elastomers

Functionalized hydrogenated diene copolymers suitable for use herein as the film forming polymer are solid phase, high polymers having a molecular weight of about 50,000 and higher, more typically 200,000 to 500,000, and contain no more than 10% conjugated diene segments by weight. These polymers are distinguished from liquid, functionalized oligomers, such as reactive terminal-group functional liquid polymers, e.g., ATBN and CTBN that are not suitable as the sole film former polymer herein but are blendable with a higher molecular weight film forming polymer (50,000 and higher). The unsaturated functionalized polymer for preparing the hydrogenated coating polymer comprises broadly, from 50 to 85 percent by weight of conjugated diene monomer units, 5 percent to 50 percent by weight one or more non-conjugated, ethylenically unsaturated monomer units, and 1 to 20 percent by weight of a functional comonomer or graft-linked compound bearing a reactive crosslinking site. The preferred conjugated diene monomer units are derived from 1,3-butadiene monomer, and the non-conjugated ethylenically unsaturated monomer units are derived from one or more ethylenically unsaturated monomers selected from unsaturated acrylic esters, methacrylic esters, nitriles such as acrylonitrile and methacrylonitrile, and monovinyl aromatic hydrocarbons such as styrene and alkylstyrenes, and vinylidene comonomers. Divinyl aromatic hydrocarbons such as divinyl benzene, dialkenyl aromatics such as diisopropenyl benzene are preferably absent. Other comonomers include alkyl (meth) acrylates such as methyl acrylate, methyl methacrylate, ethyl acrylate, butyl acrylate, 2-ethylhexyl acrylate or methacrylate, vinylpyridine, and vinyl esters such as vinyl acetate. The preferred functional comonomers are selected from unsaturated carboxylic acids and esters thereof such as acrylic acid, methacrylic acid, crotonic acid, itaconic acid, and maleic acid. The preferred glass transition temperature of functionalized diene elastomer film formers must not exceed 0° C., and preferably is less than −25° C. in order to provide flex-cracking/flex-fatigue resistance in the coating.

Carboxyl end groups can be formed on diene elastomer high polymers containing —C—CH=CH—C— type unsaturation by a chain scission methods in which a rubber ozonide is formed, and aldehyde end groups are oxidized to carboxyl groups using peroxide or peracid. Alternatively hydroxyl end groups on the rubber ozonide can be formed by reductive techniques by catalytic hydrogenation or by reducing agents like metal hydrides or borohydrides, and the like. See for example British Patent No. 884,448. Likewise, U.S. Pat. No. 4,118,427 discloses liquid hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents, preferably diisobutyl aluminum hydride, to form the above-noted hydroxyl-containing liquid prepolymers having a substantially lower molecular weight than the parent polymer.

Incorporation of mercapto alcohol, or marcaptocarboxylates as functionalized grafting compounds is readily adaptable for use in the present invention. Suitable hydroxymercaptans and/or mercaptocarboxylic acid esters containing hydroxyl. HS—R—OH compounds include those where R is a linear, branched or cyclic $C_1$–$C_{36}$ alkyl group which can optionally be substituted by up to 6 further hydroxyl groups or can be interrupted by nitrogen, oxygen or sulfur atoms. Mercaptocaboxylates include HS—$(CHR_2)_n$—$(C(O)OR_3OH)_m$ wherein $R_2$ is hydrogen or a $C_1$–$C_6$ alkyl group, $R_3$ is a linear, branched or cyclic $C_2$–$C_{36}$ alkyl group which can optionally be substituted by up to 6 further hydroxyl groups or can be interrupted by nitrogen, oxygen or sulfur atoms, n is an integer from 1 to 5 and m is an integer from 1 to 2. The hydroxyl groups are preferably primary.

Preferred hydroxymercaptans are mercaptoethanol, 1-mercapto-3-propanol, 1-mercapto-4-butanol, .α-mercapto-ω-hydroxyoligoethylene oxides, e.g., α-mercapto-ω-hydroxyoctaethylene glycol, or the corresponding ethylene oxide/propylene oxide copolyethers. Mercapto-ethanol and α-mercapto-ω-hydroxyoligoethylene oxides are preferred. Preferred mercaptocarboxylic acid esters containing hydroxyl groups are esters of mercaptoacetic acid, mercaptopropionic acid and mercaptobutyric acid with ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine. The corresponding esters of mercaptoacetic acid and 3-mercaptopropionic acid are particularly preferred. Suitable types of elastomer film former base polymers reacted with the mercapto compound include polymers of isobutylene, chloroprene, polybutadiene, isobutylene/ isoprene, butadiene/acrylonitrile, butadiene-acrylate copolymers, S—B copolymers, butadiene-vinylidene chloride-acrylate type copolymers. Methods for incorporation of mercapto compounds are described in U.S. Pat. No. 6,252,008 incorporated herein by reference and suitable for use as the functional film former polymer herein. The rubber contains in the region of 0.1 to 5 wt. % of bonded hydroxyl groups. The molecular weight of the solution polymerized diene rubber containing hydroxyl groups incorporated according to the method of U.S. Pat. No. 6,252,008 should lie in a range that dilute solutions of 5 to 15% solids can be obtained and be sprayable, brushable or dippable, such as from 10,000 to 200,000 Mn (gel permeation chromatogragphy).

There are other known approaches for incorporating OH groups into the suitable film forming polymers used herein, such as by addition reactions with formaldehyde, reaction with carbon monoxide followed by hydrogenation, and hydroboration followed by hydrolysis and copolymerization using silanes containing an ethylenic unsaturated group. Representative silane comonomers include vinylsilane or allylsilane having a reactive silicon group, of which there may be mentioned vinyltrichlorosilane, vinylmethyldichlorosilane, vinyldimethylchlorosilane, vinyldimethylmethoxysilane, divinyldichlorosilane, divinyldimethoxysilane, al lyltrichlorosilane, allyl methyldichlorosilane, allyldimethylchlorosilane, allyidimethylmethoxysilane, diallyldichlorosilane, diallyldimethoxysilane, γ-methacryloyloxypropyltrimethoxysilane, and γ-methacryloyloxypropyl methyldimethoxysilane.

The functionalized diene elastomer will be described as follows with respect to the most preferred embodiment for organic solvent-based coating embodiments of the present invention as a functionalized butadiene acrylonitrile copolymer but applies equally to preparation of the myriad other suitable functionalized diene copolymers in light of the teachings herein. Nitrile elastomers offer beneficial characteristics such as low temperature flexibility, oil, fuel and solvent resistance as well as good abrasion and water-resistant qualities, making them suitable for use in a wide variety of coating applications in accordance with the invention.

The present invention is most preferredly carried out with a functionalized hydrogenated nitrile rubber. The functionalization of HNBR with reactive functionality provides critical enabling methods for crosslinking the coating composition and obtaining the essential level of adhesion to the elastomer substrates. Without adequate adhesion to the elastomer substrate, coatings exhibit premature flex-cracking and/or delamination. The functional groups for HNBR can be generally classified as containing active hydrogen groups, ethylenic unsaturated groups or hydrolyzable groups. Crosslinking can be effected through the addition of crosslinking components mentioned herein, by exposure to moisture, heat (infra-red, thermal), by UV radiation, or by e-beam radiation, depending on the reactive functionality incorporated into the diene copolymer. Some functionalized HNBR embodiments mentioned herein below are self-curing without added crosslinker, and all can be cured with suitable crosslinking components added to the functionalized HNBR such as but not limited to dinitrosobenzene, ZnO, gamma-POM, resoles, multifunctional amine, isocyanates, acrylates, dicyandiamide, dicarboximides, and formaldehyde (or UF, MF) resins.

As another example, a functionalized HNBR can be prepared by a variety of ways known in the art. Functional groups can be incorporated by the use of functional-group-containing comonomers, or by the use of graft-linkable, functional-group-bearing compounds, and by functionalization of NBR using metathesis, followed by hydrogenation of the modified NBR to give functionalized HBNR or reaction of NBR with methylolated phenols followed by hydrogenation of the modified NBR to give functionalized HBNR.

Functionalized HNBR containing active-hydrogen bearing functional groups are preferred crosslinkable film formers in the curable emissive coating composition. The presence of unsaturated groups (i.e., vinyl and disubstituted olefins, nitriles) in the NBR provides reactive sites in which reactive functionality may be attached and used for further crosslinking, post-polymer functionalization, and grafting reactions. These reactive sites can be modified through either catalytic or non-catalytic chemistries. Such modification can introduce any number of active-hydrogen functional groups such as epoxides by epoxidation of olefinic sites. Epoxides are readily converted to other functional groups through ring-opening reactions. For example, glycols are produced by ring-opening with base, glycol ethers with alkoxides or phenoxides, alcohols with carbanions or hydrides. In addition, epoxides serve as crosslinkable sites using chemistry available to one skilled in the art. Many other functional groups may be introduced by reaction of the backbone olefins: hydroformylation (aldhehydes, alcohols, carboxylic acids), hydrocarboxylation (carboxylic acids), hydroesterification (esters), hydrosilylation (silanes), hydroamination (amines), halogenation (halogens), chlorosulfonylation (chlorine, sulfonic acids), hydroboration (boranes, alcohols, amines). Examples of such transformations have been reviewed by Tremont (McGrath, M. P.; Sall, E. D.; Tremont, S. J. "Functionalization of Polymers by Metal-Mediated Processes," Chem. Rev. 1995, 95, 381). The nitrile group of NBR elastomers also can be converted to an amide by reaction with alcohols in an acid catalyzed process and to carboxylic acids through hydrolysis.

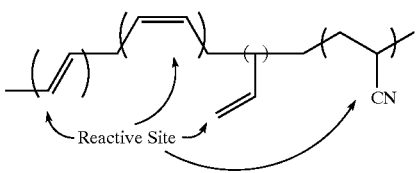

Crosslinking can be effected through the addition of a crosslinking component, moisture, thermal, UV radiation, or e-beam radiation. Depending on the reactive functionality attached to HNBR and its intended use, suitable crosslinking components can be added to the functionalized HNBR such as dinitrosobenzene, ZnO, gamma-POM, resoles, multifunctional amine, isocyanates, acrylates, and dicyandiamide. Particularly preferred crosslinking components are those components known in the art for obtaining good bonds to elastomeric articles. These components include DNB, ZnO, and QDO and can be added to enhance the adhesion of the functionalized HNBR to a wide variety of elastomeric materials.

The reactive functionality incorporated onto the diene elastomer, includes, as non-limiting examples, phenolic OH, aliphatic OH, amine, isocyanate, epoxy, acrylate, silyl ethers, silyl chlorides, anhydrides, maleimides, and Diels-Alder dieneophiles among the aforementioned functional groups.

The appropriate curing components and aids for the curing reactions are well-known in the prior literature and patents in the adhesive and coating area for curing. For example, when the functional group on the polymer is phenol, then isocyanate, dicarboximide, formaldehyde source, and resoles are suitable curing components that are useful for crosslinking the phenol-functionalized HNBR. Likewise, amine functionalized HNBR can be crosslinked using isocyanate or dicarboximide, formaldehyde source, and resoles, as examples. Epoxy functionalized HNBR can be crosslinked and cured with appropriate amines and dicyandiamide components, as is known in the art of Epoxy adhesive and coatings. Isocyanate functionalized HNBR is of particular interest because it can be crosslinked or cured by moisture or by the addition of other curative agents such as amine or polyols. Incorporation of the isocyanate as part of the HNBR is particularly desirable because it reduces that amount of free monomeric and therefore volatile isocyanate and its reported health and safety issues. A latent isocyanate functionalized HNBR can be prepared by reaction of an amine functionalized HNBR (or NBR) with a diaryl carbonate to give a urethane functionalized HNBR (or NBR). Thermal cracking of the urethane forms the isocyanate functionalized HNBR (or NBR) (For example, see: Kothandaraman, K.; Nasar, A. S. "The Thermal Dissociation of Phenol—Blocked Toluene Diisocyanate Crosslinkers", J. M. S.—*Pure Applied Chem.* 1995, A32, 1009; Wicks, D. A.; Wicks, Z. W. "Blocked Isocyanates III: Part A. Mechanisms and Chemistry", *Progress in Organic Coatings* 1999, 36, 148; Mohanty, S.; Krishnamurti, N. "Synthesis and Thermal Deblocking of Blocked Diisocyanate Adducts," *Eur. Polym. J.* 1998, 34, 77). Anhydride functionality on the film forming polymer can link to amine functional curing components. Silyl ether and chlorosilanes can be utilized in other embodiments to crosslink the film forming polymer.

Exemplary details of the aforementioned graft methods for incorporating functional groups on a film forming elastomer is the melt processing of molten film forming elastomer with a polyfunctional graftlinkable material such as polyfunctional acrylate, maleated polybutadiene, and metal salts of difunctional acrylates. For example an olefin elastomer such as EPDM can be masticated on a two roll mill, with 5 parts of an acid scavenger such as zinc oxide, 1 part stearic acid, an antioxidant and a peroxide followed by addition of 5 to 10 parts of a multi-ethylenic unsaturated compound such as trimethylolpropanetriacrylate, maleated liquid polybutadiene, or zinc diacrylate to the flux roll.

Functionalized HNBR can be prepared by the aforementioned metathesis, followed by hydrogenation of the modified NBR to give functionalized HNBR and (2) the reaction of NBR with methylolated phenols followed by hydrogenation of the modified NBR to give functionalized HNBR.

A novel method for incorporating a reactive pendant functional group, such as a carboxy, anhydride, hydroxy functionality is provided on a NBR elastomer as follows:

Direct functionalization of any suitable unsaturated film former polymer usable herein, and especially NBR, and is accomplished through the use of olefin metathesis chemistry. Here, the olefin C═C double bonds are reacted with a catalyst and a monomer. The olefin metathesis catalyst must be capable of catalyzing metathesis reactions in the presence of nitrile functional groups. The monomer can be any cycloolefin, olefin, or α,ω-diene that is capable of undergoing an olefin metathesis reaction (e.g., ring-opening metathesis polymerization [ROMP], cross-metathesis, ring-opening-cross-metathesis, and acyclic diene metathesis polymerization [ADMET]). These monomers are derivatized with groups bearing functionality (e.g., carboxylic acids, amides, esters, anhydrides, epoxy, isocyanate, silyl, halogens, Diels-Alder diene and dienophiles, etc.) to provide cure sites for secondary crosslinking reactions of the cured film or to give new properties to the polymer. Kinetically, the metathesis catalyst will likely attack the vinyl C═C bonds first, however, their low levels in the HNBR copolymer may make attack at the backbone C═C double bond competitive. Such attack on the backbone unsaturation will likely cause a drop in molecular weight of the NBR, but the extent of such a process can be minimized by using high NBR-to-catalyst levels. After reduction of the modified NBR using for example the aforementioned catalytic hydrogenation methods, a reactive modified HNBR polymer is obtained. The polymer can be crosslinked using moisture, a selected curing agent, or an external energy source (UV or e-beam). One particular preferred advantage of metathesis catalysis is that it provides a unique means of introducing reactive functionality into NBR under mild conditions in water or in solvent. So even NBR latex can be modified with reactive functionality without de-stabilizing the latex through metathesis catalyst. This feature allows the functionalization of a variety of commercially well known NBR polymers, in solution or as aqueous dispersions, and latexes (water-based polymerizate), followed by hydrogenation to yield functionalized HNBR.

Hydrogenated Protic Group Terminated Diene Polymers.

Hydrogenated hydroxy or carboxy terminated diene polymers, alone, or in blends with high molecular weight (10,000 Mn and above) film forming polymers are also suitable as a curable film former used in the emissive coating of the present invention. Substantially saturated polyhydroxylated polydiene polymers are known and commercially available. These represent anionic polymerized conjugated diene hydrocarbons, such as butadiene or isoprene, with lithium initiators, and terminated with OH groups. The process steps are known as described in U.S. Pat. Nos. 4,039,593; Re. 27,145; and U.S. Pat. No. 5,376,745, all of which are hereby incorporated by reference for their disclosure of preparing polyhydroxylated polydiene polymers. Such polymers have been made with di-lithium initiator, such as the compound formed by reaction of two moles of sec-butyllithium with one mole of diisopropylbenzene. Such a polymerization of butadiene has been performed in a solvent composed of 90% by weight cyclohexane and 10% by weight diethylether. The molar ratio of di-initiator to monomer determines the molecular weight of the polymer. The polymer is capped with two moles of ethylene oxide and terminated with two moles of methanol to produce the dihydroxy polybutadiene. The hydroxylated polydiene polymer is hydrogenated where substantially all of the carbon to carbon double bonds become saturated. Hydrogenation has been performed by those skilled in the art by established processes including hydrogenation in the presence of such catalysts as Raney Nickel, noble metals such as platinum and the like, soluble transition metal catalysts and titanium catalysts as in U.S. Pat. No. 5,039,755. Suitable polyhydroxylated polydienes are those available from Shell Chemical Company in the U.S.A. under the trade designation of KRATON LIQUID® POLYMERS, HPVM 2200 series products, and from ATOCHEMIE under the PolyBD® mark. The high molecular weight polymers suitable in blends with the hydrogenated hydroxyl butadiene polymers are not limited, and include for example the aforementioned carboxy modified chlorinated polyethylene, chlorinated polyethylene, polymers of epichlorohydrin, ethylene-acrylic copolymers, SBR, SBS, nitrile rubber (NBR), SIBS, EPDM, EPM, polyacrylates, halogenated polyisobutylene, and polypropylene oxide, among others mentioned herein, and known. The weight proportion of liquid hydrogenated polybutadiene polyol to high molecular weight film former is limited such that the percent of unsaturation in the combination is less than 20%, preferably less than 10% overall. Therefore, where mixtures of the hydrogenated polydiene polyol are made with unsaturated high polymers ($M_n$>50,000) such as SBR, NBR, and the like, the proportion of unsaturated polymer will be limited to maintain the overall degree of saturation of at least 80%, preferably at least 90%. Modified chlorinated polyolefins can include those modified with an acid or anhydride group. Some examples of modified chlorinated polyolefins are described in U.S. Pat. Nos. 4,997,882 (column 1, line 26 to column 4, line 63); 5,319,032 (column 1, line 53 to column 2, line 68); and 5,397,602 (column 1, line 53 to column 2, line 68), hereby incorporated by reference. The chlorinated polyolefins preferably have a chlorine content of from about 10 to 40 weight percent, more preferably from about 10 to 30 weight percent based on the weight of starting polyolefin. One suitable example of a modified chlorinated polyolefin is the modified chlorinated polyolefin that has a chlorine content of from about 10 to about 30 weight percent based on the weight of polyolefin, which is not neutralized with an amine, and has an acid value in the range of about 50 to about 100.

Hydrogenated Block Copolymers

Suitable film formers adaptable according the invention are hydrogenated styrene-butadiene-styrene block copolymers, hydrogenated styrene-isoprene-styrene block copolymers, which are modified according to methods disclosed herein above, adapted for chlorinated polyethylene, and elsewhere provide cure functionality on the block copolymer for interaction with the curing agent. Some elastomeric block copolymers containing carboxyl groups are available commercially. Those block copolymers which contain more than 20% unsaturation can be hydrogenated according to known hydrogenated methods, including methods referenced herein.

Phenol Functional Elastomer

Functionalization of HNBR with phenol functionality can be carried out by the combination of a methylolated phenol and the NBR, followed by hydrogenation of the phenol-modified NBR intermediate. Methylolated phenols can form covalent bonds with NBR and NBR copolymers by a variety of chemical reactions as reported in the literature [A. Knop and L. Pilato, "Phenolic Resins Chemistry and Applications and Performance" Springer-Verlag, New York 1985, Chapter 19 pg 288–297].

Various known isocyanate-reactive functional groups can be incorporated in a functionalized elastomer film forming polymer. The aforementioned carboxy-functional, hydroxy-functional and amine functional elastomers are most readily adaptable. Functional comonomers, like carboxy-functional comonomers are readily adaptable to form a copolymer of carboxylated hydrogenated nitrile rubber. For the purposes of the present invention, the functionalized hydrogenated nitrile rubber can be defined as a polymer comprising at least one diene monomer, nitrile monomer, and a functional group-bearing compound such as a comonomer or a graftlinking compound containing a functional group or a combination thereof. When the abbreviation HNBR is utilized herein, it is to be understood that the term refers to rubbers which can include diene monomer other than 1,3 butadiene, and comonomers other than acrylonitrile, unless specifically stated. It is also important to note that additional monomers can be polymerized along with or grafted to the diene monomer to form the functionalized HNBR. The additional monomers can, for example, provide at least one functional group to facilitate crosslinking.

Functionalization of HNBR with phenolic functionality can be carried out with the unsaturated un-hydrogenated polymer, or a partially hydrogenated XHNBR polymer (80–97% hydrogenation level) by addition of methylol phenol or ether derivative under heat and optionally catalyzed by suitable Lewis acid. Preferably an ether blocking group is provided on the methylol phenol compound, facilitating ease of post reaction hydrogenation. Addition can be through the nitrile or carboxyl groups by ester formation, or by way of the aforementioned addition at allylic sites. Preferably a metathesis reaction of an ethylenic unsaturated compound bearing a phenol group can be done in solvent or water. Alternatively, an olefinic bearing methylolated phenyl ether or phenol can be metathesized with NBR, followed by hydrogenation. The phenol functionalized NBR is subsequently hydrogenated. A methylolation reaction can be undertaken using a phenol functional NBR or HNBR with formaldehyde to generate a methylolated phenol functionality in the NBR, or with HNBR. The following structural diagrams illustrate functionalizing with a representative phenolic bearing compound.

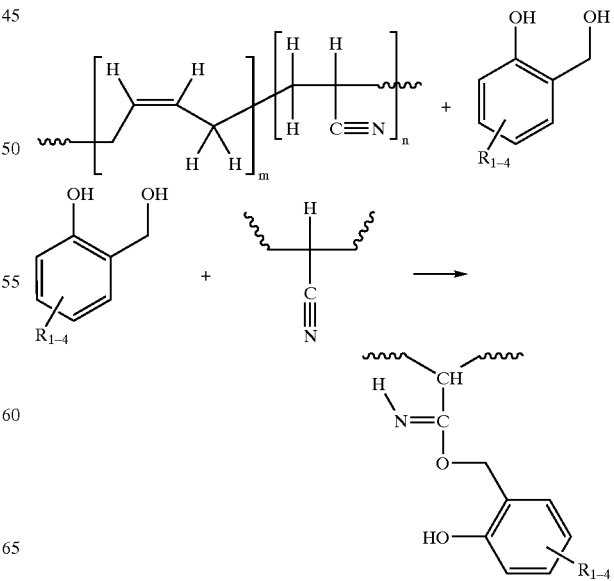

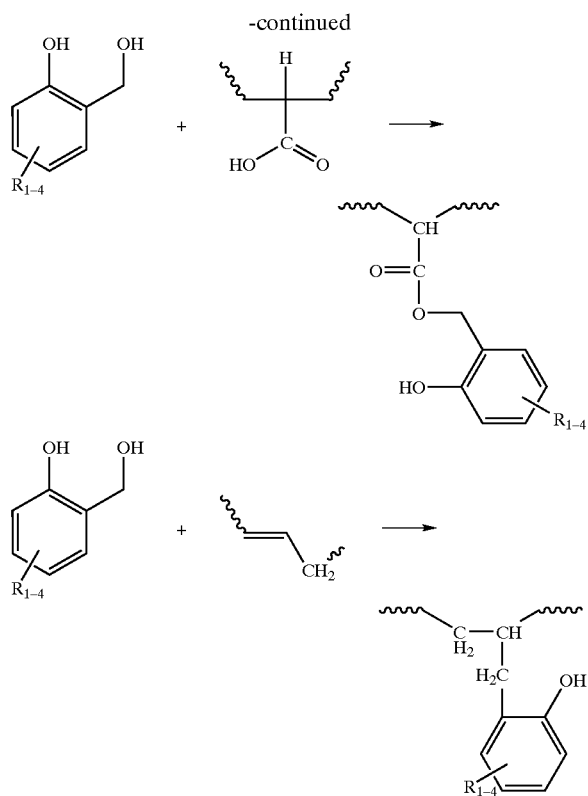

While it is possible to combine any methylolated phenol with NBR, mono-methylolated phenols are especially preferred. The combination of Mono-methylolated phenols with NBR polymers yields phenol functionalized-NBR products which are stable. After hydrogenation of the phenol-modified NBR according to known procedures in the art (e.g. cat. hydrogenation), a stable phenol-modified HNBR copolymer is obtained. The phenol-functionalized HNBR copolymer can be crosslinked with a variety of well-known crosslinkers for phenolic resins including those selected from the class of chemical compounds dicarboximides, isocyanate, and formaldehyde source (paraformaldehyde, gamma-POM, hexamethylene amine, phenolic resoles or etherified phenols).

A phenol functional HNBR can be prepared via a phenol monomer with methylolated phenol functionalized NBR/HBNR by known procedures in the art. The phenol functionalized NBR/HNBR can be prepared by either the mono-methylolated phenol or by metathesis involving unsaturated monomer with the unsaturated NBR. The methylolated phenol functionalized NBR/HBNR prepared by metathesis utilizes a methylolated phenolic monomer with NBR. These materials are useful not only as coatings in accordance with the present invention, but also as components of elastomer-to-metal adhesives, autodepositing materials, RFL dips, and reactive tougheners (e.g. epoxy adhesives) taking advantage of their unique curing, film-forming, metal adhesion and compatibility properties. Methylolated phenol functionalized NBR/HNBR are capable of self-curing (i.e. without an external curing agent). Methylolated phenol functionalized NBR/HNBRderivatives are capable of curing with other coating components, such as phenolic novolaks, active hydrogen reactive or active hydrogen containing crosslinkers and rubber/elastomer toughening agents. Methylolated phenol functional HNBR can be used with known vulcanizing agents for rubber. The vulcanization reaction is based on the formation of either a quinone methide or a benzylic carbenium that is generated by the thermal or catalytic activation of the methylolated phenols. The quinone methide intermediate reacts by abstraction of allylic hydrogen. Alternatively, methylolated phenols under acidic catalyzed conditions can generate reactive benzyl carbenium ions which will react with unsaturated polymers in the substrate.

Isocyanate functionalized HNBR can be crosslinked or cured by moisture and on contact with carboxy, amine or polyol functional silanes. Incorporation of the isocyanate as part of the HNBR is particularly desirable because it reduces that amount of free monomeric isocyanate groups and therefore volatile isocyanate and its reported health and safety issues. Maleimide functionalized HNBR can be crosslinked either by the Michael addition reactions or with suitable curing nucleophilic groups on the silane curing agent. Ethylenic unsaturated acrylate-functionalized HNBR is capable of both free radical, UV and e-beam curing. Anhydride functional HNBR can be cured using amines and components described in the art such as epoxy functional silanes. Silyl ethers and chlorides are moisture curing.

To provide the ethylenically unsaturated nitrile-conjugated diene rubber with high saturation, the nitrile rubber is hydrogenated by conventional means. Generally any of the numerous known processes for hydrogenation can be utilized, including but not limited to, solution hydrogenation and oxidation/reduction hydrogenation. The hydrogenation serves to saturate at least 80% of the unsaturated bonds of the rubber. When the degree of saturation is less than 80%, the rubber's heat resistance is low, The more preferred degree of saturation of the rubber is 95–99.99%.

The preferred conjugated diene monomers useful for preparing the carboxylated acrylonitrile-butadiene copolymers which are further hydrogenated can be any of the well-known conjugated dienes including dienes having from about 4 to about 10 carbon atoms, such as, but not limited to, 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

The unsaturated nitrile monomers copolymerized to form a carboxylated acrylonitrile-diene copolymer typically correspond to the following formula:

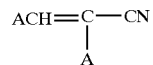

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The HNBR of the present invention also includes functional group containing monomers which are polymerized into the backbone of the HNBR, or functional group containing compounds which have been grafted to the HNBR, or a combination thereof.

Carboxyl group containing monomers are optionally utilized in the rubbers of the present invention. Carboxyl groups are derived from α,β-unsaturated monocarboxylic acid monomers with 3 to about 5 C-atoms such as acrylic acid, methacrylic acid and crotonic acid and/or other known carboxyl group-containing monomers such as, but not limited to α,β-unsaturated dicarboxylic acids with 4 to about 5 or about 6 C-atoms, e.g., maleic acid, fumaric acid, citraconic acid and itaconic acid. The bound unsaturated carboxylic acid may be present in an amount of from about 1 to about 10 weight percent of the copolymer, with this amount displacing a corresponding amount of the conjugated diolefin. Preferably, the monomer is an unsaturated mono- or di-carboxylic acid derivative (e.g., esters, amides and the like). Functions of the carboxyl group containing monomers include serving as a crosslinking site and enhancing adhesion.

Additional, functionalized comonomers can be polymerized into the backbone of the HNBR copolymer. Examples of the functional ethylenically unsaturated monomers which are copolymerizable with the nitrile monomers and the conjugated diene monomers are: hydrazidyl-group containing ethylenic unsaturated monomers, amino-group-bearing ethylenic unsaturated monomers, thiol-group bearing unsaturated ethylenic unsaturated monomers, unsaturated carboxylic acids such as acrylic acid, methacrylic acid, itaconic acid and maleic acid and salts thereof, alkyl esters of unsaturated carboxylic acids such as various acrylates, for example methyl acrylate and butyl acrylate; alkoxyalkyl esters of unsaturated carboxylic acids such as methoxy acrylate, ethoxyethyl acrylate, methoxyethyl acrylate, acrylamide, and methacrylamide, chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1, 3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

Also suitable as functional comonomers are various classes of monomers such as N,N-disubstituted-aminoalkyl acrylates; N,N-disubstituted-aminoalkyl methacrylates; N,N-disubstituted-aminoalkyl acrylamides; N,N-disubstituted-aminoalkyl methacrylamides; hydroxyl-substituted-alkyl acrylates and hydroxyl-substituted-alkyl methacrylates, N-alkylol substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide especially where free radical initiated copolymerization occurs in the presence of an alkylthiol compound having 12 to 16 carbon atoms three tertiary carbon atoms.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disubstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaminopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylaminoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethylaminoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate, N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-diethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutylaminobutyl methacrylamide, N,N-dihexylaminoethyl methacrylamide, N,N-dihexylaminopropyl methacrylamide and N,N-dioctylaminopropyl methaorylamide. Of these, N,N-dimethylaminopropyl methacrylamide, N,N-diethylaminopropyl methaorylamide and N,N-dioctylaminopropyl methacrylamide are preferable.

As specific examples of the hydroxy-substituted-alkyl acrylates and hydroxy-substituted-alkyl methacrylates, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phenoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phenoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The NBR copolymers are polymerized by reaction of any of the aforementioned exemplary conjugated dienes, unsaturated nitrile, and unsaturated functional-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc.

Hydrogenation of nitrile rubber is known to the art and to the literature. For example, a preferred commercially available X-HNBR (carboxylated-HNBR) is made from a carboxylated nitrile-diene copolymer that is hydrogenated in two steps. It is known that the C—C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation carbon-to-carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

A partly or completely hydrogenated nitrile rubber (HNBR) is also described in several specifications (for example DE-OS No. (German Published Specification) 2,539,132; DE-OS No. (German Published Specification) 3,329,974; DE-OS No. (German Published Specification) 3,046,008 and 3,046,251; and European Patent No. A-111,412). All of these specifications describe a process for the preparation of a partly or completely hydrogenated NBR which can be vulcanized (for example with the aid of sulphur vulcanization systems or peroxide vulcanization systems).

Hydrogenation of X-HNBR latex can be carried out by known conventional techniques. A carboxylated NBR polymer latex made conventionally using anionic surfactants is combined with (1) an oxidant selected from the group consisting of oxygen, air and hydroperoxides; (2) a reducing agent selected from hydrazine and hydrates thereof; and (3) a metal ion activator; (b) and heating the mixture to a temperature from 0° C. to the reflux temperature of the reaction mixture. This technique is taught in U.S. Pat. No. 4,452,950, assigned to Goodyear Tire and Rubber Co., herein incorporated by reference.

Furthermore, a hydrogenation process carried out in organic solution is known from U.S. Pat. No. 4,207,409, also incorporated by reference, in which process an NBR polymer manufactured by anionic polymerization, is taken up in solution in the presence of a catalyst mixture comprising a soluble compound of iron, cobalt or nickel, an aluminum-organic compound and water.

The most preferred acrylonitrile-butadiene copolymers are typically hydrogenated to an extent such that the final product has an unsaturation level of from about 1 to 20 mole percent, desirably from about 1 to about 10 or 15 mole percent, and preferably from about 1 to about 5 mole percent.

A suitable carboxylated hydrogenated nitrile rubber X-HNBR is manufactured by Bayer under a trade name of "Therban®", for example Therban KA 8889. X-HNBR may have an iodine value of preferably about 50% or less, more preferably about 1 to 40%, most preferably from about 1 to 20%. Resistance against heat and demanding solvents can be increased when X-HNBR having a iodine value of 50% or less (high hydrogenation ratio) is used, and rubber elasticity at a low temperature can be maintained by the use of the X-HNBR rubber having a low hydrogenation ratio. The central value of the nitrile content of HNBR is preferably from about 15 to 60%, more preferably from about 25 to 50%, most preferably from about 30 to 40%. Resistance against solvents can be increased by the use of HNBR having a nitrile content of about 15% or more, particularly about 30% or more, and low-temperature flexibility can be retained by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 40 to 100, and for a coating, lower Mooney viscosity of 40–60 is preferred. When X-HNBR having a Mooney viscosity falling within this range is used, the coating composition exhibits high resistance against organic liquids and good flexibility and low-temperature resistance.

The HNBR of the present invention can also have crosslinker reactive functional groups graft-linked thereto by aforementioned methods; either before or after hydrogenation. As examples of the unsaturated compound having a functional group, may be mentioned vinyl compounds having a functional group, and cycloolefins having a functional group. The introduction of the functional group by the graft-modifying method can be carried out by reacting the HNBR with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenyl) ethylene oxide, 2-(o-vinylphenyl)propylene oxide, 2-(p-vinylphenyl)propylene oxide, 2-(o-allylphenyl)propylene oxide, 2-(p-allylphenyl) propylene oxide, p-glycidylstyrene, 3,4-epoxy-1-butene, 3,4-epoxy-3-methyl-1-butene, 3,4- epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof.

Carboxyl group-containing unsaturated compounds include, for example, unsaturated carboxylic acids such as acrylic acid, methacrylic acid and α-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo[2.2.1]hept-5-ene-2,3-dicarboxylic acid. Further, as examples of the unsaturated carboxylic acid derivatives, may be mentioned anhydrides, esters, halides, amides and imides of unsaturated carboxylic acids, and specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of these, unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the unsaturated organosilicon compounds include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

The graft-modified HNBR according to the present invention can be obtained by graft-reacting one of the aforementioned ethylenic unsaturated compounds having a functional group with the HNBR under generation of a radical. As methods for generating the radical, may be mentioned (i) a method making use of an organic peroxide, (ii) a method making use of a photo-induced radical generator, (iii) a method by irradiation of energy rays, and (iv) a method by heating.

Method making use of an organic peroxide: As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate)hexyne-3,1,4-bis(tert-butyl peroxyisopropyl)benzene, lauroyl peroxide, tert-butyl peracetate, 2,5-dimethyl-2,5-di(tert-butyl peroxy)hexyne-3,2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. In the present invention, azo compounds may also be used as the organic peroxides. As specific examples of the azo compounds, may be mentioned azobisisobutyronitrile and dimethyl azoisobutyrate. Of these, benzoyl peroxide, and dialkyl peroxides such as dicumyl peroxide, di-tert-butyl peroxide, 2,5-dimethyl-2,5-di(tert-butyl peroxide)hexyne-3,2,5-dimethyl-2,5-di(tert-butyl peroxy)hexane and 1,4-bis(tert-butyl peroxyisopropyl)benzene are preferably used.

These organic peroxides may be used either singly or in any combination thereof. A proportion of the organic peroxide used is generally within a range of 0.001 to about 10 parts by weight, preferably about 0.01 to about 5 parts by weight, more preferably about 0.1 to about 2.5 parts by weight per 100 parts by weight of the unmodified HNBR. When the proportion of the organic peroxide used falls within this range, the rate of reaction of the functional group-containing unsaturated compound, and various properties of the resulting functional group-containing polymer, are balanced with one another at a high level. It is hence preferable to use the organic peroxide within such a range.

No particular limitation is imposed on the graft-modifying reaction, and the reaction may be carried out in accordance with any of the methods known per se in the art. The graft reaction can be conducted at a temperature of generally 0 to 400° C., preferably 600 to 350° C. The reaction time is generally within a range of 1 minute to 24 hours, preferably 30 minutes to 10 hours. After completion of the reaction, a solvent such as methanol is added in a great amount to the reaction system to deposit a polymer formed, and the polymer can be collected by filtration, washed and then dried under reduced pressure.

A proportion of the photo-induced radical generator can be used for grafting typically within a range of 0.001 to about 10 parts by weight, preferably about 0.01 to about 5 parts by weight, more preferably about 0.1 to about 2.5 parts by weight, in terms of a charged proportion upon the reaction, per 100 parts by weight of the unmodified HNBR. When the proportion of the photo-induced radical generator used falls within this range, the rate of reaction of the functional group-containing unsaturated compound, and various properties of the resulting functional group-containing polymer, are balanced with one another at a high level. It is hence preferable to use the photo-induced radical generator within such a range.

Method by irradiation of energy rays: The method by irradiation of energy rays is a publicly known method in which active energy rays such as alpha-rays, beta-rays and gamma-rays are irradiated to generate a radical. In particular, it is desired that ultraviolet light be used from the viewpoints of efficiency, practicability and profitability.

Method by heating: The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

Direct modification of carbon-carbon unsaturated bonds in the NBR or HNBR can also be utilized to add functional groups thereto. The carbon-carbon unsaturated bonds are present in the precursor NBR and as residual unsaturation in the HNBR, therefore the modified HNBR according to the present invention can be obtained by modifying the carbon-carbon unsaturated bonds to add a functional group to the addition polymer.

No particular limitation is imposed on the method for introducing the functional group on the film forming polymer, and examples thereof also include (a) a method by oxidation of unsaturated bonds, (b) the aforementioned method by an addition reaction of a compound containing at least one functional group in its molecule to unsaturated bonds, (c) the methods mentioned herein of introducing an epoxy group, carboxyl group, hydroxyl group, or aforementioned reaction of an olefinic bond of the NBR or HNBR polymer with an unsaturated, preferably a monounsaturated, carboxylic reactant, and the end group addition to living cationic initiated polymer. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause the aforementioned thermal "ene" reaction to take place. Alternatively, the monounsaturated carboxylic acid can be reacted with the polymer by free radical induced grafting. The functionalized film former used in the present invention can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the present invention can be functionalized by methods of air oxidation, ozonolysis, hydroformylation, epoxidation and chloroamination, or the like by any other method (for example, Japanese Patent Application Laid-Open No. 172423/1994).

(ii) Fluoroelastomers

Fluorocarbon elastomers (fluoroelastomers) are derived from hydrocarbons, including vinylidene fluoride, hexafluoropropylene and are commercially available from a number of suppliers. A detailed discussion of the various types of fluoroelastomers is contained in an article by R. G. Arnold, A. L. Barney and D. C. Thompson that appeared in the July, 1973 issue of a journal entitled "Rubber Chemistry and Technology" (Volume 46, pp. 619–652). A fluoroelastomer is distinguished from a thermoplastic fluoropolymer principally by whether plastic deformation occurs upon stressing the fluoroelastomer to 100% elongation. Fluoroplastics undergo deformation on stretching and are unsuitable coating materials for elastomeric substrates according to the present invention.

The representative fluoroelastomers used herein include polymers derived from one or more fluorinated monomers. Example polymers derived from a fluorinated monomer or combinations of two or more fluorinated monomers include 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. Provisions of incorporating functional groups as disclosed above are applicable to fluoroelastomers. The most preferred fluoroelastomer modified according to the invention is commercially available from DuPont under the Viton ® designation, such as a copolymer of vinylidenefluoride and hexafluoropropylene, or a terpolymer of vinylidenefluoride, tetrafluoroethylene, and hexafluoropropylene. Other suitable fluoroelastomers are available from Dyneon under the FLUOREL® mark, and from Ausimont under the TECHNIFLON® mark.

The graft-functionalized fluoroelastomer embodiment film former utilized herein is the reaction product of a fluoroelastomer polymer and a grafting agent which contains a graft linking group which covalently bonds to the fluoroelastomer, and at least one active hydrogen-containing group, including but not limited to hydroxyl, thiol, or carboxyl groups that undergo bond formation to one of the reactive groups of the curing component. The graft-modified fluoroelastomer is combined with the curing component in admixture, within the time of the pot life (prior to gellation) of the admixture prior to the time of coating the flexible substrate.

Preferred grafting components for fluoroelastomers contain one graft-linking group and one active hydrogen-bearing group. The preferred grafting agent contains a primary amine group and one active hydrogen-containing group. Examples include hydroxyamines, aminoisocyanate, such as $(R_2)_2 NCH_2 CH_2 NCO$, wherein $R_2$ is, for example, hydrogen or a hydrocarbyl group, hydroxyalkylamines, aminocarboxylates, aminosilane, amino silanol, aminothiols, and the like. Other suitable grafting agents that do not contain a primary amine as the graft-linking group are mercapto hydroxy, like mercaptoalcohols and mercaptosilanols, and mercaptothiols. The preferred grafting agents will graft to the fluoroelastomer at relatively mild temperatures (<60° C.) and can be monomeric, oligomeric or polymeric, and contains at least one active hydrogen-containing group and no more than one primary amine group, but can contain optionally secondary or tertiary amine groups, or other groups not capable of graft-linking and crosslinking the fluoroelastomer. An optional secondary amine is believed to increase the rate of the graft reaction of the primary amine graft-linking groups to the fluoroelastomer. Specific examples of grafting agents include the various hydroxyalkyl amines, e.g. 3-amino-1-propanol, aminoalkyl silanols, e.g., aminoalkyl silane triol or precursor aminoalkyl-alkoxysilanes which include within each molecule at least one basic nitrogen capable of catalyzing the hydrolysis of the alkoxysilane groups to produce the reactive silane triol; amine-N-oxides, amino(hydroxy) carboxylic acids, amido(hydroxy)amines, polyoxyalkylene polyether mono(primary)amines, and amine-terminated polyols. Such amine-terminal polyols can be made by the known aminating methods for the polyaddition of alkylene oxides, such as for example ethylene oxide, propylene oxide, butylene oxide, dodecyl oxide or styrene oxide onto amino-starter compounds. Generally, the polyol, such as a polyether polyol is aminated with ammonia in the presence of a catalyst such as a nickel containing catalyst, e.g., a Ni/Cu/Cr catalyst. The known methods are taught in U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147, all incorporated herein by reference. The starter compounds used are ammonia or compounds containing amine groups and will provide in the reaction product no more than one primary amino group, such as for example aliphatic polyamines such as ethylenediamine, ethylenediamine oligomers (for example diethylenetriamine, triethylenetetramine or pentaethylenehexamine), ethanolamine, 1,3-propylenediamine, N-(2-Hydroxyethyl) ethylenediamine,1,3- or 1,4-butylenediamine, 1,2-, 1,3-, 1,4-, 1,5-, 1,6-hexamethylenediamine, and the like. Suitable polyether blocks for the polyether-monoamines include polyethylene glycol, polypropylene glycol, copolymers of polyethylene glycol and polypropylene glycol, poly(1,2-butylene glycol), and poly(tetramethylene glycol).

The preferred amino-hydroxy grafting agent compounds are compounds having a molecular weight of less than about 1000, preferably 500, more preferably less than 250. More preferable amino-hydroxy grafting agents contain from 2 to 16 carbon atoms. With grafting agents having a molecular weight above about 1000, the degree of flexibility and solvent resistance of the coating is reduced. Examples of more preferred grafting agents include 3-amino-1-propanol, 2-(2-aminoethylamino)ethanol and aminoalkyl silanol, e.g., aminopropyl silane triol. The effective amount of grafting agent used in relation to the weight of fluoroelastomer is from 1–20%, preferably from 2–10% by weight, more preferably 3 to 7% by wt.

Other exemplary grafting agents which provide hydroxyl-functionalized fluoroelastomers, although less preferred, include grafting hydroxyl-functional ethylenic unsaturated compounds via a graft-addition reaction. Aforementioned mercaptohydroxy and mercapto carboxy compounds are suitable. Hydroxy or carboxy group-containing ethylenic unsaturated monomers are suitable and include, but are not limited to 2-hydroxyethyl (meth)acrylate, 1-hydroxypropyl (meth)acrylate, 2-hydroxypropyl (meth)acrylate, 2-hydroxyethyl vinyl ether, N-methylol(meth)acrylamide, methacrylic acid, and maleic anhydride, and can be grafted to the fluoroelastomer in the presence of a free radical initiator by techniques known in the art of reactive processing of polymers, widely practiced in thermoplastics such as polyolefins.

In another embodiment, a fluorocarbon elastomer is graft-functionalized by an addition reaction with a hydroxy(alkyl) mercaptan, aminothiol, or mercaptocarboxylic acid optionally containing hydroxy group(s). Suitable mercaptans which yield bound hydroxyl groups for addition to fluoroelastomers include hydroxymercaptans like mercaptoethanol, hydroxyalkylmercaptans, such as 1-mercapto-3-propanol, mercaptoethanolamine, 1-mercapto-4-butanol, α-mercapto-ω-hydroxyoligoethylene oxides, e.g., α-mercapto, ω-hydroxyoctaethylene glycol, or the corresponding ethylene oxide/propylene oxide copolyethers. Mercaptoalkoxy compounds which yield hydroxy groups upon hydrolysis include γ-mercaptopropyltrimethoxysilane, γ-mercaptopropyltriethoxysilane, γ-mercaptopropylmethyldimethoxysilane, and γ-mercaptopropylmethyldiethoxysilane, to name a few. Suitable mercaptocarboxylic acids and corresponding esters are the aforementioned mercaptoacetic acid, and esters of mercaptoacetic acid, mercaptopropionic acid and esters, mercaptobutyric acid and esters. Esterifying compounds containing hydroxy groups include ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine.

Mercapto-compounds, especially mercapto-acids and mercapto-alcohols can be graft-linked in effective amounts for subsequent reaction with the curing agent to any hydrocarbon elastomer suitable herein. Especially useful in the preparation of functionalized fluoroelastomers, diene elastomers, α-olefin copolymers, mercapto compounds can be incorporated under mild temperatures or at ambient temperatures. The addition of the mercapto-compounds to graft to the fluoroelastomer can be carried out optionally with a free radical initiator in solution at a temperature above the decomposition temperature of the initiator, using for instance, an azo initiator such as azobisisobutyronitrile and azobiscyclohexanenitrile, a peroxide such as dilauroyl peroxide, benzpinacol silyl ether, or photoinitiators in the presence of UV or visible light. Diacyl peroxides, especially dilauroyl peroxide, didecanoyl peroxide, di(3,3,5-trimethylhexanoyl) peroxide, disuccinoyl peroxide and dibenzoyl peroxide, are suitable. An effective amount of free radical initiator is 0.5 to 10 wt. %, based on wt. of mercapto-compound. A preferred mercapto compound is mercapto alcohol, such as mercaptoethanol. An effective amount of starting mercapto-compound is from 3% to 10% on wt. of fluoroelastomer, and is sufficient to bond at a level of 1% to 5% by wt. of bound hydroxyl groups to the fluoroelastomer.

The more preferred fluoroelastomer grafting agents are those that will graft to the fluoroelastomer at room temperature, obtainable by the use of such compounds as 2-(2-aminoethylamino)ethanol ($NH_2$—$CH_2$—$CH_2$—NH—$CH_2$—$CH_2$—OH)(CAS # 111-41-1) and aminopropylsilanetriol, such as supplied in a 22-25% solution in water by Gelest, Inc. as SIA0608.0 (CAS # 29159-37-3).

Crosslinkable α-Olefin Copolymer Elastomers

Poly(olefin/acrylic ester/carboxylate) copolymer film forming elastomers are copolymers produced by polymerizing at least one α-olefin with at least one $C_1$–$C_{18}$ alkyl (meth)acrylate and, aminor amount of an unsaturated functional group-bearing comonomer that is accessible to form crosslinks with such materials as polyisocyanates, carbodiimides, and other agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an α-olefin-ester copolymer, e.g. by partial hydrolysis of pendant ester groups. Suitable α-olefins for polymerization of such olefin copolymer film-forming elastomers include ethylene, propylene, butene-1, isobutylene, pentenes, heptenes, octenes, and the like including combinations. $C_1$–$C_4$ α-olefins are preferred and ethylene is most preferred.

The functionalized comonomer provides copolymerized α-olefin polymers bearing a nucleophilic group, or an electrophilic group, e.g., active hydrogen group, halogen group, or a group which can be converted, such as by transamidation or hydrolysis, or conversely, the functionalized comonomer contains a group that is reactive with crosslinking agents bearing an a corresponding coreactive group, such as an active hydrogen group. The alkyl or alkoxy(meth) acrylate acids and esters are exemplary functionalized comonomers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy (meth)acrylates optionally incorporated with α-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethyle-hexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the α-olefin monomers are: unsaturated carboxylic acids such as acrylic acid, methacrylic acid, itaconic acid and maleic acid and salts thereof, alkyl esters of unsaturated carboxylic acids such as methyl acrylate and butyl acrylate.

A preferred α-olefin-acrylic ester copolymer rubber comprises unsaturated carboxylic acid monomer unit, such as acid units, e.g. derived from (meth)acrylic acid or maleic acid, or anhydride units, e.g. derived from maleic anhydride or partial ester units, e.g. derived from mono ethyl maleate. In a preferred embodiment the polymer is a terpolymer of ethylene, $C_1$–$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below room temperature, i.e. below about 20° C.

Other comonomers which contain a functional acid, hydroxy, epoxy, isocyanate, amine, oxazoline, diene or other reactive functional group include the diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl (meth)acrylate and dihydrodicyclopentadienyloxyethyl (meth)acrylate.

Further examples of functional comonomers include the N-alkylol and N-alkoxy amides of α,β-olefinically unsaturated carboxylic acids having from 4 to 10 carbon atoms such as N-methylol acrylamide, N-ethanol acrylamide, N-propanol acrylamide, N-methylol methacrylamide, N-ethanol methacrylamide, n-butoxy acrylamide and isobutoxy acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are N-methylolacrylamide, N,N'-dimethylolacrylamide and N-ethoxymethylolacrylamide; and N-substituted methacrylamides such as N-methylolmethacrylamide, N,N'-dimethylolmethacrylamide and N-ethoxymethylmethacrylamide. Because of their ready availability and relative low cost, the preferred N-alkylol amides of α,β-monoolefinically unsaturated monocarboxylic acids are N-methylol acrylamide and N-methylol- and n-butoxy-methacrylamide.

Other examples of functional comonomers bearing groups which are either reactive with active hydrogens or themselves contain active hydrogen groups are epoxy group-containing ethylenically unsaturated compounds including allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxymethyl-5-norbornene. Specific examples of common carboxyl group-containing ethylenically unsaturated compounds include acrylic acid, methacrylic acid, crotonic acid, 2-pentenpic acid, maleic acid, fumaric acid and itaconic acid.

Examples of the other ethylenically unsaturated (meth)acrylic esters comonomers include octyl methacrylate; cyano-substituted alkyl (meth)acrylates such as 2-cyanoethyl acrylate, 3-cyanopropyl acrylate, and 4-cyanobutyl acrylate; amino-substituted alkyl (meth)acrylates such as diethylaminoethyl acrylate; fluorine-containing acrylates such as 1,1,1-trifluoroethyl acrylate; hydroxyl group-substituted alkyl (meth)acrylates such as hydroxyethyl acrylate; alkyl vinyl ketones such as methyl vinyl ketone; vinyl or allyl ethers such as vinyl ethyl ether and ally methyl ether; vinyl aromatic compounds such as styrene, α-methylstyrene, chlorostyrene ad vinyltoluene; vinylamides such as acrylamide, methacrylamide and N-methylolacrylamide; and ethylene, propylene, vinyl chloride, vinylidene chloride, vinyl fluoride, vinylidene fluoride, vinyl acetate, alkyl fumarate, etc.

When the acrylic acids and acrylates are part of the elastomer film forming copolymer backbone, transamidation reactions may be made in melt processing techniques which are known to produce pendant hydroxyl functionality such as by employing an aminoalcohol, e.g., 2-amino-1-ethanol. A further reaction by the pendant hydroxyls may occur, i.e., transesterification with another acrylate linkage, resulting in crosslinking and an increase in product viscosity is preferably avoided.

Acrylic Elastomers

Functionalized acrylate elastomers are suitable if the glass transition temperature is below −10° C., and are defined as addition polymers derived from a major amount (greater than 50 wt. % on total polymer weight) of one or more copolymerizable α,β-ethylenic unsaturated ester monomers having the general structure

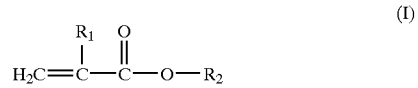

(I)

where $R_1$ is hydrogen or methyl; $R_2$ represents $C_1$–$C_{20}$ alkyl, $C_2$–$C_7$ alkyl, $C_2$–$C_7$ alkoxyalkyl, $C_2$–$C_7$ alkylthioalkyl, $C_2$–$C_7$ cyanoalkyl, and aminor amount of active hydrogen-group bearing comonomer or active bearing group graft-linked functional site. The acrylates are available in solid bale, and as emulsions or latexes from a variety of commercial sources. Minor amounts of up to about 35% on total acrylate rubber weight, of hardening or $T_g$ increasing comonomers, e.g. methyl methacrylate, acrylonitrile, vinyl acetate, vinylidene chloride and/or styrene, to name a few, can be included. Desirably, the functional group bearing comonomer having active hydrogen or a group reactive with active hydrogen containing curing agent is an unsaturated monocarboxylic acid (e.g. acrylic or methacrylic acid) or polycarboxylic acid (e.g. itaconic, citraconic acid, etc.) or anhydrides of polycarboxylic acids.

Specific examples of suitable acrylic or methacrylic monomers alone and in combinations include methyl acrylate, ethyl acrylate, butyl acrylate, butyl methacrylate, ethylhexyl acrylate, and the like. A preferred copolymer comprises one or two different copolymerizable monomers each having structure (I) in which $R_1$ is hydrogen; and, $R_2$ is $C_4$–$C_8$ alkyl, or $C_2$–$C_8$ alkoxyalkyl, either of which may contain a primary, secondary or tertiary C atom. Examples of more preferred $C_4$–$C_8$ alkyl acrylates are n-butyl acrylate, isobutyl acrylate, n-pentyl acrylate, isoamyl acrylate, hexyl acrylate, 2-methylpentyl acrylate, n-octyl acrylate, and 2-ethylhexyl acrylate; of preferred $C_4$–$C_8$ alkoxyalkyl acrylates are methoxy acrylate, and ethoxyethyl acrylate; of a preferred alkylthioalkyl acrylate is methylthioethyl acrylate; of preferred $C_2$–$C_7$ cyanoalkyl acrylates are cyanoethyl acrylate and cyanoproyl acrylate; and mixtures of two or more of the foregoing may be used.

Preferred active hydrogen bearing comonomers for acrylic elastomers include many of the above mentioned functional comonomers bearing active hydrogens, some of which are repeated here include comonomers containing carboxylic anhydride, carbonamide, N-substituted carbonamide, aldehyde, alkyl and aryl keto, hydroxyl radicals, allylic chlorine radicals, methylol, maleimide, bis-maleimide, alkyl N-methylol, phenolic methylol, thiol radicals, amino radicals, isocyanate radicals, alkoxyalkyl radicals, oxirane radicals, and the like. The α,β-unsaturated hydroxy carboxylic acids or anhydrides of dicarboxylic acids are preferred. If the polymers are only copolymers of acrylate ester and carboxylic acid or anhydride comonomers, they desirably have from about 90 to about 98 mole percent repeat units from acrylate ester, more desirably from about 92 to about 97 or 98 mole percent of the ester and from 2 to 10% of carboxylic acid or anhydride, more preferably 3 to 8% of carboxylic acid or anhydride.

Exemplary functional comonomers incorporated randomly during addition polymerization of the copolymer include glycidyl methacrylate, acrylic and methacrylic acids, maleic anhydride, N-alkyl maleimide, acrylamide, N-alkoxyalkyl acrylamides such as N-isobutoxymethyl acrylamide, N-hydroxymethyl acrylamide and the like, methyl vinyl ketone, acrolein, vinyl isocyanate, hydroxyalkyl acrylates such as 2-hydroxyethyl acrylate, 2-hydroxyethyl methacrylate and the like. Also included are mixtures of two or more such functional monomers.

Included in acrylic elastomers are the so-called core-shell polymers. The rubbery copolymers useful in soft-shell copolymers include copolymeric compositions of at least one acrylic monomer whose homopolymer $T_g$ is below −10° C., and a second copolymerizable functional monomer. These monomers can be polymerized in the presence of minor proportions of monovinyl or vinylidene monomers set forth above such as for example styrene, acrylonitrile, methyl methacrylate and the like, in a proportion with the low $T_g$ acrylic comonomer(s) selected so as to not raise the $T_g$ of the resulting acrylic copolymer above about −10° C.

A core-shell acrylic addition copolymer can further include a second copolymerizable functional monomer, defined as a monoethylenically unsaturated monomer containing at least one reactive functional radical. The second functional monomer may be any of those defined hereinabove as useful for the preparation of the core copolymer including mixtures containing two or more such functional monomers, with the proviso that the reactive functional radical of said second functional monomer must be capable of reacting with the reactive functional radical of the first functional monomer contained in the core copolymer. In that sense, the reactive functional monomer contained within the core copolymer and the reactive functional monomer contained within the shell copolymer are complementary or interactive. The shell copolymer can contain no more than about 2 wt. % of copolymerizable di- or trivinyl monomers such as a glycol diacrylate, divinylbenzene, trialkylcyanurate or the like to provide further grafting sites, as is widely practiced in the art.

The shell copolymer is an addition polymer and may be varied over a wide composition range, however, for most purposes the copolymer will comprise from about 99.9 to about 95 wt % of at least one rubbery monomer and from about 0.1 to about 5 wt. % of second copolymerizable functional monomer. The preferred shell copolymers are copolymers of an alkyl acrylate and 2-hydroxyethyl methacrylate.

The elastomeric coatings of this invention based on sequential polymerized functionalized addition polymers may exhibit two glass transition temperatures, one of which is below 0° C., and one above 0° C. The amount of rubbery shell copolymer component as well as the proportion of hard component and rubbery component may be varied however, for most purposes the ratio of rigid copolymer component to rubbery shell copolymer component is less than 1, meaning the amount of rubbery component is in a major proportion of greater than 50%.

Dual (halo, carboxy) functionalized acrylic addition polymers are also useful as the film-former for organic solvent-borne embodiments of the invention and comprise repeating units from acrylic ester monomers or monomer mixtures and which exhibit a glass transition temperature in the elastomer less than −20° C. The functional group is provided from a combination of from about 0.1% to about 30%, preferably from 0.2% to about 15% by weight of an active halogen-containing comonomer and from about 0.1% to about 20% by weight of a carboxyl-group containing comonomer. In the preferred level of halogen-containing comonomer, the halogen content is from about 0.1% to about 5% by weight of the functionalized acrylic rubber. The halogen groups of the halogen-containing comonomer can be chlorine, bromine, or iodine. Chlorine containing comonomers are preferred from an economic, availability and safety basis. Examples of halogen containing comonomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-α-chloroacetoxymethyl)-2-norbornene, 5-(α, β-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

A preferred active hydrogen bearing comonomer for acrylic rubber is present from about 0.1% to about 20% by wt., preferably from 0.2% to about 10%, more preferably from 2% to about 6% by weight of at least one carboxyl group-containing comonomer. The carboxyl comonomer is preferably monocarboxylic, but can be polycarboxylic. Preferred carboxyl comonomers contain from 3 to about 8 carbon atoms. Examples of such preferred comonomers are acrylic acid, methacrylic acid, ethacrylic acid, β, β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like. The most preferred carboxyl comonomers are the monocarboxylic acid monomers such as acrylic acid, methacrylic acid, itaconic acid, and the like.

The functional group-containing comonomers are incorporated as introduced above most conveniently during the addition polymerization of acrylate elastomers. Polymerization by way of conventional suspension, emulsion, solution, and bulk methods are suitable. These polymerizations are initiated using free radical initiators. The emulsion polymerization method is preferred. Various conventional soaps, emulsifiers, and surfactants, known to the art and to the literature can be utilized in emulsion polymerized functional acrylate rubber synthesis. The weight average molecular weight of the dual-functionalized acrylate elastomer is generally in excess of 100,000. Commercial grades are available from Zeon Chemicals under the HYTEMP® mark.

A variety of $C_2$–$C_8$ alkyl ester copolymer latexes containing active hydrogen functional groups are known and available from a variety of commercial sources. A preferred acrylic rubber in latex form is available from Noveon® under the HYSTRETCH trademark. An emulsion polymerized copolymer of n-butylacrylate, acrylonitrile, N-methylol acrylamide and itaconic acid, exhibiting a $T_g$ of less than 20° C. is a preferred film former for use in aqueous coating embodiments.

Urethane modified acrylic materials conforming to the requirements of the film former as set forth herein are also contemplated. The urethane-modified acrylate polymers are cured with the curing agent by moisture. The glass transition temperature of such urethane-modified acrylates must be 0° C. or less and are comprised of a major amount (more than 50% by wt. or mole %) of $C_2$–$C_8$ acrylic or methacrylic esters. An example of preferred urethane-modified acrylic resins usable in the present invention is an acrylic copolymer produced by copolymerizing 60 to 70 moles of methyl-, ethyl-, or butyl-acrylate, or mixture thereof with 5 to 50 moles of methacrylic acid and 30 to 80 moles of 2-hydroxymethyl methacrylate. Some or all of the hydroxyl and carboxyl groups are capped in a reaction with α,β-ethylenic unsaturated isocyanate, for example, methacryloyloxyethyl isocyanate (2-isocyanate ethyl methacrylate). This material is moisture curable, and curable by UV by incorporation of a conventional photoinitiator. In mosture curable acrylourethane embodiments, it is preferred that at least 10 mole %, preferably at least 50 mole % of the hydroxyl groups from the 2-hydroxyethyl methacrylate units have been reacted with the methacryloyloxyethyl isocyanate. The α,β-ethylenic unsaturated isocyanate is preferably based upon the reaction product of an isocyanate and hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used optionally with 3-aminopropyl triethoxy silane,3-aminopropyl trimethoxy silane, 3-aminopropyl methyl dimethoxysilane or 3-aminopropyl methyl diethoxy silane, primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane $NH_2$ $(CH_2)_3$—$Si(OCH_3)_2$—O—$(CH_3O)_2$ Si—$(CH_2)_3$ $NH_2$, polyglycolether-modified aminosilanes such as that sold under the Trademark "Dynasylan 121" and triamino functional propyl trimethoxy silanes such as "Dynasylan TRIAMO" available from Huls A G. Similar silanes having two or three silicon atoms can also be used.

Maleated Elastomeric Materials

Various polymer blends, alloys and dynamically vulcanized composites of maleated addition polymers based on polyethylenes, such as maleated polypropylenes, maleated styrene-ethylene-butene-styrene-block copolymers, maleated styrene-butadiene-styrene block copolymers, maleated ethylene-propylene rubbers, and blends thereof can be utilized as the functionalized film-forming elastomer in accordance with the invention. The maleated elastomers are dissolved in an appropriate organic solvent system.

Ethylene Vinyl Ester Copolymers

Film forming, solvent soluble, OH-functional ethylene copolymers are available in various grades which contain carboxyl or hydroxyl functional groups and are also suitable as the film former used herein. Conventionally, some of these polymers are used as cross-linkable hot melt adhesives, however these polymers are readily adaptable for ambient temperature cured emissive coating films herein even though the elevated temperature cohesiveness is relatively low. The ethylene vinyl ester polymers containing hydroxyl functionality can be adapted for use in the emissive coating composition and cured with unblocked isocyanates and provide sufficient properties for certain environmental temperatures not exceeding the temperature at which the cured coating will flow. An ethylene vinyl acetate copolymer containing OH groups is based on a polymer having monomeric units ethylene and of vinyl alcohol, and optionally vinyl acetate, the melt viscosity being preferably from 4 to 40 Pa.s at 180° C. Ethylene vinyl alcohol copolymers have preferably at least 5 wt % of vinyl alcohol units. One example is a terpolymer (viscosity 20 Pa.s at 180° C., MFR at 125° C. under 325 gm load of 6.4 gm/10 min) with 10% vinyl alcohol, 88.75% ethylene and 1.2 wt % vinyl acetate. The m.p. is 101.5° C. (by DSC). Another terpolymer contains 13.7 wt % vinyl alcohol, 82.3% ethylene and 4.0 wt % vinyl acetate (viscosity 5.8 Pa.s at 180° C., MFR at 125° C. under 325 gm (cf. 30.4 gm/10 min, DSC m.p. 91.degree. C.). In a preferred interpenetrating type network, an olefinic rubber polymer as random or block copolymers, e.g., SBS, EBS, EPM and EPDM, hydrogenated polydiene copolymer, acrylic rubber, and others of the aforementioned film formers, either with or without functional groups is blended with a partially hydrolyzed ethylene vinyl acetate polymer in a proportion of from 10–90 wt. % to 90–10 wt. %, respectively, and cured with any of the suitable curing agents disclosed herein, and equivalents thereof.

Functionalized EPM and EPDM Elastomers

Functionalized EPM and EPDM elastomers are suitable film forming elastomers used as the film former in the emissive coating. These comprise two or more α-monoolefins, copolymerized with a polyene, usually a non-conjugated diene comonomer. Useful polyenes include 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, etc.; or a combination thereof. Preferred polyenes for the EPM and EPDM functionalized elastomers are 5-vinyl-2-norbornene, 5-ethylidene-2-norbornene and 1,4-hexadiene. Functional groups can be incorporated by the aforementioned conventional routes, and by the metathesis route disclosed herein.

In one aspect of the methods disclosed in this invention a particularly useful scheme for the production of polymers containing organic acid functionality such as carboxyl functionality, aliphatic or aromatic hydroxyl functionality, and the like and inorganic acid functionality such as sulfonic acid functionality, phosphoric acid functionality and the like is provided.

One such scheme is illustrated below for EPM and EPDM rubber, for incorporating pendant carboxyl, hydroxyl or non-sterically hindered pendant olefinic functionality.

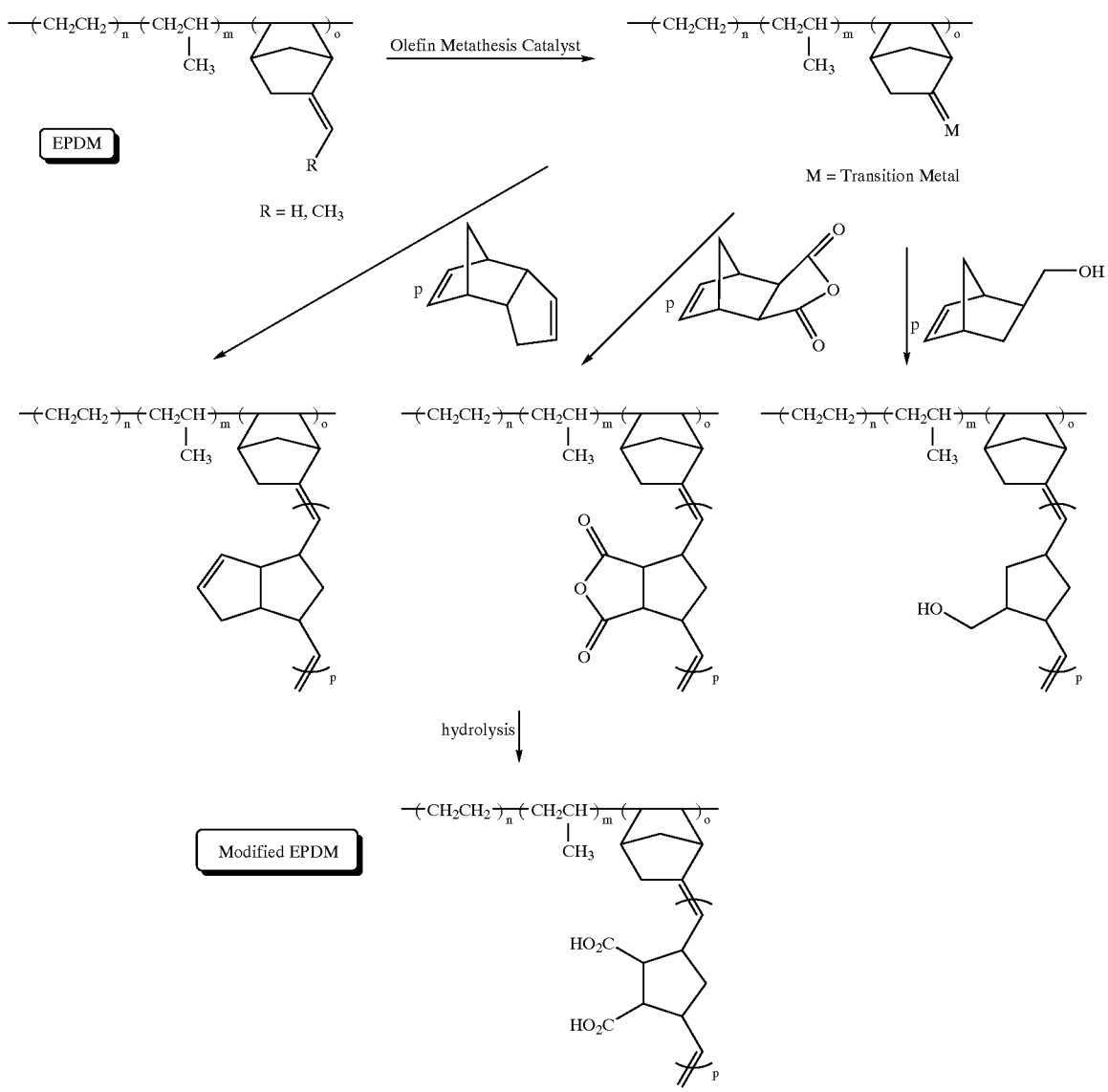

wherein n represents a conventional number of repeating ethylene units, m represents a conventional number of propylene repeating units, o represents a number of conventional diene monomer repeating units, and p represents the number of repeating units of maleated dicyclopentadiene ranging from 1 to 100. The same approach as illustrated above for modifying EPDM can be utilized for incorporating a functional group in a conjugated diene polymer, such as a butadiene-acrylonitrile copolymer containing vinyl unsaturation.

Examples of preferred functionalized film forming polymers having a $T_g$ of leass than 0° C. include carboxylated hydrogenated nitrile rubber and ethylene-carboxyl copolymers (sold under the tradename of Vamac® by DuPont).

Curing Component

The curing component is a tetravalent silane compound containing at least one silicone bonded group which is coreactive with functional groups on the film forming polymer. One such group is a hydrolyzable group, or group that interacts with the functional group on the film former polymer via condensation. The silicone bonded group is an active hydrogen bearing group coreactive with the coreactive group on the film former polymer, or the silicone bonded group is coreactive with active hydrogen bearing groups on the film former polymer. Reactive groups provided in the silane bonded group include, alkoxy, hydroxy, mercapto, isocyanato, halo, amino, phenolic, glycido, and the like. These silane compounds are all known and available from a number of commercial sources. Representative hydroxyalkyl group-containing silanes have the general structure:

(A)

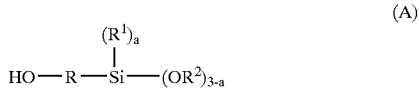

wherein R in all instances herein is a divalent aliphatic, cycloaliphatic or aromatic saturated or unsaturated radical having from 1 to 20 carbon atoms, and is preferably an alkylene radical having from 1 to 9, most preferably 2 to 4, carbon atoms; $R^1$ is a monovalent aliphatic, cycloaliphatic or aromatic radical having from 1 to 20 carbon atoms, and is preferably selected from the group consisting

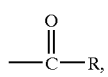

of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms; $R^2$ is a monovalent aliphatic, cycloaliphatic or aromatic organic radical containing from 1 to 8 carbon atoms, and is preferably selected from the group consisting of alkyl radicals having from 1 to 4 carbon atoms, $R^3$—O—$R^4$, and where $R^3$ is an alkylene group having from 1 to 4 carbon atoms (methyl, ethyl, propyl, butyl) and $R^4$ is an alkyl group having from 1 to 4 carbon atoms; and a is zero or 1, preferably zero;

Aminofunctional silanes include those having the structure (B)

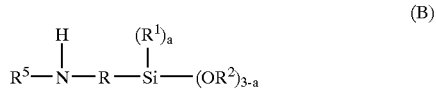

(B)

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—NH—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Mercaptofunctional silanes include those having the structure (C)

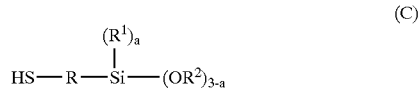

(C)

wherein R, $R^1$, $R^2$ and a are as previously defined for (A);

Other organosilane compounds have a single organic chain having from 1 to 20 carbon atoms, at least one extractable hydrogen atom which is preferably attached to a functional group separated from the silicon atom by a chain of at least 3 interconnected carbon atoms.

Representative organosilanes containing active hydrogen groups are hydroxypropyltrimethoxysilane, hydroxypropyltriethoxysilane, hydroxybutyltrimethoxysilane, γ-aminopropyltrimethoxysilane γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, γ-aminobutylmethyldiethoxysilane, δ-aminobutylethyldiethoxysilane, γ-aminoisobutylmethyldiethoxysilane, N-methyl-g-aminopropyltriethoxysilane, N-phenyl-γ-aminoisobutylmethyldieth oxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methyl aminopropyltriethoxysilane, γ-aminopropylmethoxydiethoxysilane, and the like.

Also suitable as the curing agent, or in combination with other functional group-containing curing agents are hydroxy silanes having an (Si—OH bond), such as silanediols or silanetriols, independent of any degree of neutralization. The silanols preferably contain at least one nucleophile connected to silicon through a first connecting group. As used herein, the term "neutralized" means that at least some of the silanol groups are in the form of mono-, di-, or tribasic alkali metal salts. The extent of neutralization is that amount sufficient to inhibit no more than 50% of the condensation of condensable groups of the silanol. The curing agent can be a partially neutralized silanol represented as follows:

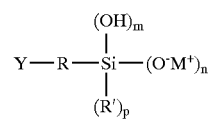

where n is 1, 2, or 3; m is 0, 1, or 2; p is 0 or 1, preferably 0, with the proviso that m+n+p=3; R is the first connecting group; $M^+$ is an alkali salt forming metal; Y contains a nucleophilic group; and R' is a linear, branched, or cyclic $C_1$–$C_8$-alkyl group, preferably methyl or ethyl, more preferably methyl.

Connecting group R is preferably a linear, branched, or cyclic alkylene group, or arylene group, or a combination thereof, and may contain one or more heteroatoms, which may themselves be nucleophilic. More preferably, X is a $C_2$–$C_6$-alkylene group or —R'—NH—R'—, where each R' is independently a $C_2$–$C_4$-alkylene group.

Examples of suitable nucleophile groups include amines, phenols, mercaptans, and carboxylates, with primary and secondary amines and mercaptans being preferred, primary and secondary amines being more preferred, and primary amine being most preferred. A specific example of partially neutralized aminosilanetriols are typically potassium or sodium salts of 3-aminopropyl-silane triol and N-(2-aminoethyl)-3-aminopropyl-silanetriol.

The preferred curing component will have at least one silicone bonded group that contains a substituted or unsubstituted alkylamino group and hydrolyzable groups bonded to silicone capable of condensation with silane. The amine group may be in the free unblocked form or as a blocked amino group. Blocking of the amine group can be provided by reaction with methyl isobutyl ketone or methyl amyl ketone. The preferred groups reactive with the silane compound are preferably a $C_1$–$C_4$ alkoxy groups. Examples of curing components include but are not limited within the class of aminosilanes are aminopropyltriethoxy or -methoxy silane and aminoethylaminopropyltriethoxy or -methoxy silane, 3-aminopropyl triethoxy silane, 3-aminopropyl trimethoxy silane, 3-aminopropyl methyl dimethoxysilane or 3-aminopropyl methyl diethoxy silane, a silane containing primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane, $NH_2$ $(CH_2)_3$—Si $(OCH_3)_2$—O—$(CH_3O)_2$ Si—$(CH_2)_3$ $NH_2$, polyglycolether-modified aminosilanes such as that sold under the Trademark "Dynasylan 121" and triamino functional propyl trimethoxy silanes such as "Dynasylan TRIAMO" available from Huls AG. Similar silanes having two or three silicon atoms can be used.

The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —$(CH_2CH_2O)_2CH_3$; or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical and M' is any divalent hydrocarbon radical both valences of which are attached to the carbon, such as hexylene, pentylene or octylene; ureido groups of the formula —N(M)CONM"$_2$ in which M is a hydrocarbon or halohydrocarbon radical and M" is H or any of the M radicals; carboxyl groups of the formula —OOCMM" in which M and M" are defined above or halogenated hydrocarbon radical, or carboxylic amide radicals of the formula —NMC=O(M") in which M and M" are defined above. X can also be the sulfate group or sulfate ester groups of the formula —$OSO_2(OM)$ where M is defined above hydrocarbon or halogenated hydrocarbon radical; the cyano group; the isocyanate group; and the phosphate group or phosphate ester groups of the formula —$OPO(OM)_2$ in which M is defined as above.

The amount of curing component employed must be in excess of the stoichiometric amount of functional film forming polymer. The excess curing agent is an amount which provides at least 50% of free silane not curing to the functional polymer after the mixture of parts A and B is made. The equivalent weight of the curing component is below 200, while the equivalent weight of co-reactive groups on the film forming polymer is on the order of 1000 or higher. On a weight basis, 25 to 150 parts of curing component is present per 100 wt. parts of film former wherein the film former contains no more than 10 wt. % of functional groups which cure with the curing component. This is essential to provide a brush, spray or dip enabling viscosity and sufficient pot life. Optionally a lower aliphatic alcohol can be added. The preferred solvent is MIBK and/or acetone.

In those embodiments providing emissive properties, an effective amount of a metal conductive pigment is included to provide complete surface coverage in the coating for effective radiant heat emissive properties. The term "particles" is inclusive of irregular shapes, granular shapes, leafy shapes or complex assorted shapes. Heat reflective pigments are available in many forms, as fine-grain solids, or leafs, in dry powder form or dispersion or as pastes in solvent or plasticizer, e.g., mineral spirit. Flakes derived from finely divided vapor deposited films are suitable. Thermally conductive metal particles include finely divided irregular particles, or leafy particles of brass, titanium, silver, or aluminum. Included are metal-coated particles/metal coated films which are preferably introduced as leafing or non-leafing aluminum flakes. Leafing flakes such as leafing aluminum particles or flakes are available commercially with a coating, e.g., stearic acid, and when applied to a surface, the particles orient in an interleaved structure parallel to the surface of the finished emissive coating. Metallic particles of a particle size average of 5 to 25 $\mu$m employed at a level of at 10 to 100 parts by weight per 100 parts by weight of film forming elastomer when cast in a thin film of 5 mils (0.01 cm.) provide effective radiant energy emmissivity and yet provide sufficient flex-fatigue resistance in the coating so as to not undergo stress-cracking. Stress cracking causes loss in emissive performance. Metal particles having an average particle size of 25 to 100 microns must be employed at a level of at least 20 parts and up to 150 weight parts per 100 parts by weight of film former to provide sufficient radiant heat emissivity without stress cracking. Aluminum flakes are typically available in an average particle size of less than about 300 microns in diameter. The maximum diameter of the metallic particles with high aspect ratio is rather indeterminate with two major dimensions (width and length) and one minor dimension (thickness) which may be multiples or orders of magnitude smaller than the two major dimensions. Reliance is on supplier specifications to characterize the average particle size. Preferably, aluminum flakes have a number average particle size of about 1 to about 100 microns, more preferably between 5 and 60 microns, and still more preferably between 10 and 45 microns. Preferred aluminum particles are flakes of a size such that 99.9% pass through 325 mesh screen, i.e., a diameter of less than about 45 microns, most preferably from 8 and 35 and especially from 10 and 20 microns in average particle size.

The leafing metal flakes can be introduced as a dry flake rather than the paste of aluminum and solvents having at least about 40 wt-% aluminum flake and more preferably about 60 to 70 wt-% aluminum flake as described in U.S. Pat. No. 5,045,114. The metal particles are employed in the aforementioned quantity in relation to the film forming polymer in order to exhibit emissive performance. The preferred amount of metal particles is in a range of from 15 to 30 parts by weight per 100 parts by weight of film former. This proportion of includes consideration of surface additives, e.g., surfactants, or adhesion promotoer, e.g., silanes.

Coated Articles

A myriad of articles comprising flexible polymers are coated according to the invention. Included are the engineered elastomeric products which are designed to flex and bend, distort, and/or dampen forces including absorbing torque or vibration repeatedly during their service life and are utilized in numerous industrial applications. Specific examples are hoses, seals, mountings, such as engine mounts, dampers and insulating devices, to name a few. In the case of pneumatic tire coatings on the exterior side wall, the invention provides a critical cured elongation of at least 300%, preferably at least 400% by ASTM D-412 elongation test on unsupported cured coating films. As molded parts, like rubber hoses, plastic housings, belts, various mounts, shrouds, seals, grommets, washers, spacers, covers, and housings, etc. which are necessarily rubbery, made of thermoplastic elastomers or of the thermosetting (vulcanized) rubber materials, the adhesion of the coatings is essential as well as the cured physical properties of the coating. The coatings as cured must be capable of 100% elongation, and exhibit no distortion. That is the coatings recover completely when extended up to 100% elongation without cracking or delaminating from the flexible polymer substrate. Coatings on pneumatic, automotive tires, according to the invention exhibit a critical and improved elongation of 300% and above, preferably 400%+/–50%, as tested according to ASTM-D412 on cured, unsupported coating films.

Coating Film Strength

Cured with no reinforcing fillers, amorphous ethylene-acrylic polymers such as Vamac® have tensile strength of typically about 400 psi. A solvent solution of unreinforced X-HNBR cured with a di-isocyanate has tensile strength of around 600 to 1000 psi. Either of these polymers cured using the specified level of monomeric silane curing component have surprising tensile strengths. At levels of silane below the specified level, the coatings cure, but lack the strength obtained at the higher levels. The following examples illustrate the effect of the proportion of curing component.

EXAMPLE 1

| Ingredient | Parts by weight | | | | |
|---|---|---|---|---|---|
| | 1A | 1B | 1C | 1D | 1E |
| MIBK | 190.0 | 190.0 | 190.0 | 190.0 | 190.0 |
| Therban ® KA-8889 (X-HNBR) | 10.0 | 10.0 | 10.0 | 10.0 | 10.0 |
| Aminopropyltriethoxysilane | 7.5 | 10.0 | 12.5 | — | — |
| Aminoethylaminopropyl-trimethoxysilane | — | — | — | 2.5 | 7.5 |
| Tensile strength (psi) | 3150 | 3765 | 3205 | 605 | 1975 |
| Elongation (%) | 365 | 390 | 355 | 280 | 400 |

As is seen from the results above, a minimum of 25 effective parts of curing component per 100 parts of film forming polymer is required to provide coatings having adequate strength, while the elongation remains sufficient to provide the elongation properties for adequate flexing ability.

| Ingredient | parts by weight | | | | |
|---|---|---|---|---|---|
| MIBK | 145.0 | 145.0 | 145.0 | 145.0 | 145.0 |
| Vamac ® G (ethylene acrylic) | 15.0 | 15.0 | 15.0 | 15.0 | 15.0 |
| Aminopropyltriethoxysilane | 5.0 | 7.5 | 10.0 | 12.5 | 15.0 |
| Tensile strength (psi) | 1800 | 1915 | 3770 | 2745 | 2865 |
| Elongation (%) | 565 | 560 | 660 | 580 | 545 |

Coated Substrate Examples

Elastomeric Coatings were made by dissolving Therban® KA-8889 carboxylated hydrogenated nitrile-butadiene rubber or Vamac® G ethylene acrylic elastomer in Methyl Isobutyl Ketone (MIBK, CAS No. 108-10-1) to a solids content of 10.0 to 25% by weight.

To this solution, aminopropyltriethoxysilane or aminoethylaminopropyltrimethoxysilane was added at levels between 25% and 125% by weight based on the solids weight of the elastomer in the solution. These coatings were used to coat rubber substrates based on natural rubber, Vamac®), and fluorocarbon elastomer (Viton®). Adhesion was evaluated using the cross-hatch cut tape adhesion test (per General Motors spec GM9770P, method B). Adhesion to the Viton® and Vamac® rubber substrates was excellent with no surface treatment on the substrates. Adhesion to the natural rubber was excellent after treatment with Chemlok® 7701 (chlorination substitute). These coatings also passe the coating cure test per General Motors spec GM9770P, method A Q-tip rub test with naptha) and the Crocking Test with naptha per Ford spec BN 107-01. The coating produces a semi-gloss finish that is visually appealing.

What is claimed is:

1. An ambient temperature curable coating which is a mixture of 2-parts and from 4% to 25% by weight solids content, and comprising, in part (A) an organic solvent, a flexible, film-forming polymer exhibiting a $T_g$ of less than 0° C., and from 0 to 20% unsaturation and incorporated in said film forming polymer a functional group coreactive with a curing component, and in part (B) from 25 to 150 parts by weight per one hundred parts by weight of said film forming polymer, of a curing component which is a silane compound containing at least one group which is coreactive with said functional group on said film forming polymer, said coating in the cured state exhibiting at least 100% elongation as an unsupported film.

2. The coating of claim 1 wherein said curing component contains a active hydrogen-bearing group and said film forming polymer contains a pendant group that is coreactive with active hydrogen bearing group on said curing component.

3. The coating of claim 1 wherein said film forming polymer is a hydrogenated random or block diene copolymer having a molecular weight of about 20,000 to 200,000.

4. The coating of claim 1 wherein said film forming polymer is carboxylated HNBR and said curing component is an aminosilane.

5. The coating of claim 1 wherein the film forming polymer comprises a carboxy-functionalized and halogen-functionalized acrylic rubber.

6. The coating of claim 1 wherein said film forming polymer is derived from an ethylenically-unsaturated monomer and an α,β-unsaturated carboxylic acid.

7. The coating of claim 1 wherein said functional group on said film forming polymer is selected from the group consisting of sulfonic acid, sulfonic acid derivatives, chiorosulfonic acid, a vinyl ether, vinyl ester, primary amine, secondary amine, tertiary amine, mono-carboxylic acid, dicarboxylic acid, partially or fully ester derivatized mono-carboxylic acids, partially or fully ester denvatized dicarboxylic acids, anhydride of dicarboxylic acids, cyclic imides of dicarboxylic acids, and combinations thereof, and wherein said curing component contains an electrophilic group coreactive with said film forming polymer.

8. The coating composition of claim 1 wherein said film former is a hydrogenated diene elastomer comprising methylol functional groups.

9. The coating composition of claim 3 wherein said film former is a hydrogenated diene elastomer comprising phenolic methybol functional groups.

10. The coating of claim 1 wherein said film former is the thermal cracked reaction product of an amine functionalized HNBR with a diaryl carbonate.

11. The coating of claim 6 wherein said film former comprises a terpolymer of ethylene, $C_1$–$C_4$ alkyl acrylate and a carboxylic acid monomer unit.

12. The coating of claim 6 wherein said film former comprises at least 30 mole percent of ethylene, and from 10 to about 70 mole percent mono ethyl maleate.

13. The coating of claim 1 wherein said film former is a carboxylated, block copolymer derived from an elastomer and selected from the group consisting of hydrogenated styrene-butadiene-styrene block copolymers, and hydrogenated styrene-isoprene-styrene block copolymer.

14. The coating of claim 1 wherein the film forming elastomer is a poly α-olefin-acrylic ester-acrylic carboxylate terpolymer.

15. The coating of claim 1 wherein said film former is a hydrogenated nitrile butadiene polymer containing hydroxyl groups.

16. The coating of claim 1 wherein said film former is a mixture of hydrogenated hydroxyl butadiene and a film former selected from the group consisting of carboxy modified chlorinated polyethylene, chlorinated polyethylene, polyepichlorohydrin, poly ethylene-acrylic acid, SBR, SBS, NBR, SIBS, EPDM, EPM, polyacrylates, halogenated polyisobutylene, and polypropylene oxide, and wherein the total proportion of unsaturation in said mixture is not more than 10% overall.

17. The coating of claim 1 wherein said film former comprises hydroxyl groups incorporated by treating a hydrocarbon polymer under ozonization conditions to form an ozonized saturated hydrocarbon polymer followed by reducing the ozonized saturated hydrocarbon polymer.

18. The coating of claim 1 wherein said film former contains carboxyl groups incorporated by treating a saturated hydrocarbon polymer under ozonization conditions to form an ozonized saturated hydrocarbon polymer followed by reducing the ozonized saturated hydrocarbon polymer.

19. The coating of claim 1 wherein said film forming polymer comprises two or more α-monoolefins, and a non-conjugated diene comonomer and incorporated thereon are functional groups selected from the group consisting of carboxylic, anhydride, epoxy, phosphoric, sulfonic, sulfenate, sulfinate, hydroxy, epoxy, isocyanate, amine, and oxazoline groups.

20. The coating of claim 1 wherein said film former comprises hydroxy terminated polyisobutylene prepared by introducing hydroxy groups into the terminal positions of cationically polymerized isobutylene by dehydrochlorinating, hydroborating and oxidizing chloroterminal polyisobutylene.

21. The coating of claim 1 wherein said curing component is a polyisocyanate containing from 10 to 50% reactive NCO groups which are liquid at ambient temperature.

22. The coating composition of claim 1 wherein said curing component is in 2-parts and comprises a reduction-oxidation curing system comprising a multifunctional ethylenic unsaturated compound, an oxidizing component and a reducing component.

23. The coating composition of claim 1 wherein said film former comprises a chlorinated polyolefin modified with an acid or anhydride group.

24. A method for coating a shaped elastomer article, said article optionally affixed to a shaped metal article, comprising spraying, dipping or brushing a solvent-based, room temperature curing elastomeric film forming coating to the surface of said molded elastomer article, said coating comprising a mixture of 2-parts and from 4% to 25% by weight solids content, and comprising, in part (A) an organic solvent, a flexible, film-forming polymer exhibiting a $T_g$ of less than 0° C., and from 0 to 20% unsaturation and incorporated in said film forming polymer a functional group coreactive with a curing component, and in part (B) from 25 to 150 parts by weight per one hundred parts by weight of said film forming polymer, of a curing component which is a silane compound containing at least one group which is coreactive with said functional group on said film forming polymer, said coating in the cured state exhibiting at least 100% elongation as an unsupported film.

25. The method of claim 24 wherein said elastomer article comprises an elastomer selected from the group consisting of natural rubber, styrene butadiene rubber, polybutadiene rubber, ethylene propylene rubber, ethylene propylene diene rubber, polyisobutylene-isoprene rubber, polychloroprene, and low acrylonitrile content (<35%) nitrile-butadiene rubber.

26. The coating composition of claim 1 wherein said film forming polymer is selected from the group consisting of ethylene-acrylic copolymer and carboxylated hydrogenated nitrile butadiene and said curing agent is selected from the group consisting of aminopropyltriethoxy, aminopropyl trimethoxy silane, aminoethylaminopropyltriethoxy, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl) tetramethoxy and bis(3-aminopropyl) tetraethoxy disiloxane.

* * * * *